United States Patent
Oohashi et al.

(10) Patent No.: US 6,707,211 B2
(45) Date of Patent: Mar. 16, 2004

(54) STATOR FOR AN AUTOMOTIVE ALTERNATOR AND METHOD FOR MANUFACTURE THEREOF

(75) Inventors: Atsushi Oohashi, Tokyo (JP); Yoshihiro Harada, Tokyo (JP); Takushi Takizawa, Tokyo (JP); Kensaku Kuroki, Tokyo (JP); Hirotatsu Kanai, Tokyo (JP); Yoshihito Asao, Tokyo (JP); Katsumi Adachi, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/118,919

(22) Filed: Apr. 10, 2002

(65) Prior Publication Data

US 2003/0015932 A1 Jan. 23, 2003

(30) Foreign Application Priority Data

Jul. 18, 2001 (JP) .......................... 2001-217868

(51) Int. Cl.[7] .................. H02K 3/04; H02K 3/12; H02K 3/32
(52) U.S. Cl. .................. 310/179; 310/207; 310/201; 310/180
(58) Field of Search .................. 310/179, 180, 310/206, 207, 201

(56) References Cited

U.S. PATENT DOCUMENTS 6,137,201 A * 10/2000 Umeda et al. .............. 310/179
6,404,092 B1 * 6/2002 Baumann et al. ........... 310/201
6,469,408 B2 * 10/2002 Asao ........................... 310/62
6,501,205 B1 * 12/2002 Morishita et al. ........... 310/184
2002/0043886 A1    4/2002 Fujita et al.

FOREIGN PATENT DOCUMENTS

| DE | 38 03 752 A | 8/1988 |
|----|-------------|--------|
| EP | 1 109 295 A | 6/2001 |
| EP | 1 109 299 A | 6/2001 |
| GB | 369185 A | 3/1932 |
| JP | 2000-299949 | 10/2000 |
| WO | WO 98/54823 A1 | 12/1998 |

OTHER PUBLICATIONS

Communication for EP 02 02 2315 dated Mar. 14, 2003.

Patent Abstracts of Japan, abstracting JP–A–61–240832 dated Oct. 27, 1986.

Patent Abstracts of Japan, abstracting of JP–A–06–141496 dated May 20, 1994.

* cited by examiner

Primary Examiner—Thomas M. Dougherty
Assistant Examiner—J. Aguirrechea
(74) Attorney, Agent, or Firm—Sughrue Mion, PLLC

(57) ABSTRACT

A stator winding is formed by inserting two conductor segments each from a first end surface of a stator core into a pair of slots separated by six slots and joining together end portions of the conductor segments extending outward from a second end surface of the stator core, slot-housed portions of the conductor segments being formed with a rectangular cross section and linking portions constituting coil ends being formed with a circular cross section.

11 Claims, 18 Drawing Sheets

(a)

(b)

STATOR FOR AN AUTOMOTIVE ALTERNATOR AND METHOD FOR MANUFACTURE THEREOF

This application is based on Application No. 2001-217868, filed in Japan on Jul. 18, 2001, the contents of which are hereby incorporated by reference.

BACKGROUND OF THE INVENTION

1. Field of the Invention

The present invention relates to a stator for an alternator driven by an internal combustion engine, for example, and particularly relates to a stator winding construction of the stator for an automotive alternator mounted to an automotive vehicle such as a passenger car or a truck, and to a method for the manufacture thereof.

2. Description of the Related Art

In recent years, compactness and high output have come to be in increasing demand in automotive alternators.

In order to achieve compactness and high output in automotive alternators, improvements in the space factor of electrical conductors housed inside a magnetic circuit of a stator, and alignment in rows and increases in density of crossover portions of a stator winding (the crossover portions outside a stator core being called coil ends) are required.

In view of these conditions, a construction has been proposed in WO 98/54823, for example, attempting to improve the space factor of the electrical conductors and to achieve alignment in rows and increases in the density of the coil ends by using short conductor segments for the electrical conductors of the stator winding.

In WO 98/54823, a stator is disclosed in which a stator winding is installed by inserting a plurality of U-shaped conductor segments having a rectangular cross-sectional shape from a first end of a stator core, then joining together end portions at the opposite end from the insertion end. Because conductor segments having a rectangular cross-sectional shape are used in this stator, the conductor segments can be housed inside the slots without gaps, enabling improvements in space factor. The stator is characterized in that a stator winding in which the coil ends are disposed regularly is formed more easily than in general conventional stators constructed by winding continuous conductor wires into an annular shape to form annular winding units, forming the annular winding units into a star shape to prepare star-shaped winding units, and installing the star-shaped winding units in the stator core. In other words, alignment in rows and increased density in the coil ends of the stator winding is achieved.

However, in the stator described in WO 98/54823, the conductor segments are prepared by bending short conductor wires having a rectangular cross-sectional shape at a central portion thereof to form the U shape. In this bending process, large stresses arises in the bent portion of the rectangular conductor wires, damaging the electrically-insulating coating covering the conductor segments and causing electrical insulation to deteriorate.

Thus, it has been proposed in Japanese Patent Non-Examined Laid-Open No. 2000-299949, for example, that a central portion only of short conductor wires having a rectangular cross-sectional shape is formed into circular cross-sectional shape, to reduce the stresses arising in the bent portion during bending in an attempt to suppress damage to the electrically-insulating coating.

FIG. 26 is a cross section showing part of a conventional stator for an automotive alternator described in Japanese Patent Non-Examined Laid-Open No. 2000-299949, for example, and FIG. 27 is a perspective showing conductor segments constituting a stator winding of the stator in FIG. 26.

In FIG. 26, a stator winding installed in slots $2a$ of a stator core 2 is constituted by a plurality of electrical conductors, four electrical conductors being housed in each of the slots $2a$ and an insulator 3 being disposed so as to surround the four electrical conductors. The four electrical conductors in each of the slots $2a$ are arranged in a single row inside the slot in order of Address 1, Address 2, Address 3, and Address 4 from a radially-inner side.

An electrical conductor $4a$ in Address 1 of a first slot $2a$ forms a pair with an electrical conductor $4b$ in Address 4 in a second slot $2a$ a pitch of one pole away in a clockwise direction around the stator core 2. Similarly, an electrical conductor $5a$ in Address 2 of the first slot $2a$ forms a pair with an electrical conductor $5b$ in Address 3 in the second slot $2a$ a pitch of one pole away in a clockwise direction around the stator core 2. The electrical conductors $4a$, $4b$, $5a$ and $5b$ forming these pairs are connected by passing through return portions $4c$ and $5c$ described below using continuous wires at a first axial end of the stator core 2.

Consequently, at the first end of the stator core 2, the continuous wire connecting the electrical conductor $4b$ in Address 4 and the electrical conductor $4a$ in Address 1 surrounds the continuous wire connecting the electrical conductor $5b$ in Address 3 and the electrical conductor $5a$ in Address 2. In other words, at the first end of the stator core 2, the return portion $5c$ is surrounded by the return portion $4c$. Hence, at the first end of the stator core 2, a first coil end group is constructed by arranging the return portions $4c$ and $5c$ in a circumferential direction to form two layers in an axial direction.

On the other hand, the electrical conductor $5a$ in Address 2 of the first slot $2a$ forms a pair with the electrical conductor $4a$ in Address 1 in the second slot $2a$ a pitch of one pole away in a clockwise direction around the stator core 2. Similarly, the electrical conductor $4b$ in Address 4 of the first slot $2a$ forms a pair with the electrical conductor $5b$ in Address 3 in the second slot $2a$ a pitch of one pole away in a clockwise direction around the stator core 2. The electrical conductors $4a$, $4b$, $5a$ and $5b$ forming these pairs are connected by joining at a second axial end of the stator core 2.

Consequently, at the second end of the stator core 2, outer joint portions connecting the electrical conductor $4b$ in Address 4 and the electrical conductor $5b$ in Address 3, and inner joint portions connecting the electrical conductor $4a$ in Address 1 and the electrical conductor $5a$ in Address 2 are arranged in a mutually offset state in a radial direction and circumferential direction. Hence, at the second end of the stator core 2, a second coil end group is constructed by arranging the outer joint portions and the inner joint portions in two rows in a circumferential direction so as to form a single row in a radial direction.

As shown in FIG. 27, the electrical conductor $4a$ in Address 1 and the electrical conductor $4b$ in Address 4 are furnished by a large segment 4 in which a short conductor wire is formed into a U shape, and the electrical conductor $5a$ in Address 2 and the electrical conductor $5b$ in Address 3 are furnished by a small segment 5 in which a short conductor wire is formed into a U shape. Each of the segments 4 and 5 are provided with portions which extend in an axial direction so as to be housed inside the slots 2a, and are also provided with inclined portions 4f, 4g, 5f, and 5g extending so as to be inclined at a predetermined angle relative to the axial direction and return portions 4c and 5c connecting the inclined portions 4f, 4g, 5f, and 5g. First coil ends extending outward at the first axial end surface of the stator core 2 are formed by the inclined portions 4f, 4g, 5f, and 5g and the return portions 4c and 5c.

At the second end of the stator core 2, the projecting ends of the large segments 4 are bent away from each other, and the projecting ends of the small segments 5 are bent toward each other. The inner joint portions are formed by joining together large-segment end portions 4d and small-segment end portions 5d by welding, and the outer joint portions are formed by joining together large-segment end portions 4e and small-segment end portions 5e by welding. Hence, second coil ends extending outward at the second axial end surface of the stator core 2 are formed by inclined portions 4h, 4i, 5h, and 5i, the inner joint portions joining the large-and small-segment end portions 4d and 5d, and the outer joint portions joining the large-and small-segment end portions 4e and 5e.

Moreover, the large segments 4 and the small segments 5 are formed by plastically deforming a central portion of short conductor wires having a rectangular cross section (a flat cross section) into a circular cross section and are then bent into a general U shape, only the return portions 4c and 5c being formed with a circular cross section, the remaining portions being formed with a rectangular cross section.

In the conventional stator described in WO 98/54823, because the conductor segments have a flat cross-sectional shape, improvement of the space factor of the electrical conductors, and alignment in rows and increased density of the coil ends are made possible, enabling compactness and high output to be achieved in an automotive alternator, but when the short conductor wires having a flat cross-sectional shape are bent into the U shape, large stresses arise in the bent portion, and one problem has been that the electrically-insulating coating covering the bent portion is damaged, making electrical insulation poor. In addition, when the coil ends come into contact with each other during assembly of the stator winding or due to vibrations generated during operation of an actual machine mounted with the stator, the corner portions of the conductor segments rub against each other, or the corner portions rub against the flat surfaces, and another problem has been that damage is caused to the electrically-insulating coating, also making electrical insulation poor.

In the conventional stator described in Japanese Patent Non-Examined Laid-Open No. 2000-299949, because the stator winding is constructed using large segments 4 and small segments 5 in which only the return portions 4c and 5c are formed with a circular cross section and the remaining portions are formed with a rectangular cross section, stresses arising in the return portions 4c and 5c when the short conductor wires are bent into the U shape are reduced, suppressing the occurrence of damage to the electrically-insulating coating covering the return portions 4c and 5c. However, because the inclined portions 4f, 4g, 5f, and 5g are formed with a flat cross-sectional shape, when the inclined portions 4f, 4g, 5f, and 5g come into contact with each other during assembly of the stator winding or due to vibrations generated during operation of an actual machine mounted with the stator, the corner portions of the inclined portions rub against each other, or the corner portions rub against the flat surfaces, and one problem has been that damage is caused to the electrically-insulating coating, also making electrical insulation poor.

SUMMARY OF THE INVENTION

The present invention aims to solve the above problems and an object of the present invention is to provide a stator for an automotive alternator and a method for manufacture thereof enabling compactness and high output to be achieved in the automotive alternator and also enabling electrical insulation to be improved by forming slot-housed portions of conductor wires with a flat cross-sectional shape and forming coil ends composed of inclined portions and return portions with a circular cross-sectional shape.

With the above object in view, a stator for an automotive alternator includes a stator core in which a plurality of slots are formed and a stator winding formed by installing conductor wires in the slots, the conductor wires being covered with an electrically-insulating coating. The stator winding is provided with slot-housed portions each formed with a flat cross-sectional shape, 2n of the slot-housed portions being housed in each of the slots, where n is an integer, and the slot-housed portions being arranged so as to line up in a single row in a slot depth direction inside each of the slots such that flat surfaces of the slot-housed portions are in close contact with side wall surfaces of the slots; n first coil ends each connecting in series a pair of slot-housed portions housed in different addresses relative to the slot depth direction in each pair of first and second slots separated by a predetermined number of slots by means of a continuous conductor wire having a non-flat cross section at a first axial end of the stator core; and n second coil ends each connecting in series a pair of slot-housed portions housed in different addresses relative to the slot depth direction in the each pair of first and second slots separated by the predetermined number of slots at a second axial end of the stator core. The n first coil ends are arranged at a pitch of one slot in a circumferential direction to constitute a first coil end group, and the n second coil ends are arranged at a pitch of one slot in the circumferential direction to constitute a second coil end group.

Therefore, there is provided a stator for an automotive alternator enabling compactness and high output to be achieved in an automotive alternator, and also enabling electrical insulation to be improved.

Each of the second coil ends may be formed by a continuous conductor wire having a non-flat cross section.

A cross-sectional area of the coil ends having the non-flat cross section may be larger than a cross-sectional area of the slot-housed portions.

The slot-housed portions housed in an outermost address in the slots may be formed with a cross-sectional shape in which a radius of curvature of radially-outer corner portions is greater than a radius of curvature of radially-inner corner portions.

The slot-housed portions housed in an innermost address in the slots may be formed with a cross-sectional shape in which a radius of curvature of radially-inner corner portions is greater than a radius of curvature of radially-outer corner portions.

The electrically-insulating coating on the flat surfaces of the slot-housed portions in close contact with the side wall surfaces of the slots may be formed so as to be thinner than the electrically-insulating coating on radially-outer and inner portions of the slot-housed portions.

The electrically-insulating coating of the slot-housed portions may be applied in two layers.

The electrically-insulating coating may be constituted by a lower electrically-insulating coating composed of an adhesion-enhanced resin and an upper electrically-insulating coating composed of a heat-tolerant resin.

The first and second coil end groups may be constructed such that inclined portions of the first and second coil ends inclined relative to an axial direction of the stator core are arranged so as to be placed in contact in the circumferential direction, the inclined portions being positioned between portions rising from the slot-housed portions and apex portions.

The slot-housed portions may be formed so as to have a hardness which is greater than that of inclined portions inclined relative to an axial direction of the stator core in the coil ends having the non-flat cross section, the inclined portions being positioned between portions rising from the slot-housed portions and apex portions.

An output wire of the stator winding extending outward from either of the first and second coil end groups may be formed so as to have a circular cross section.

With the above in view, a method for manufacturing a stator for an automotive alternator includes the step of preparing a strip-shaped winding unit constructed by arranging conductor wire pairs equal in number to a predetermined slot pitch so as to be offset by a pitch of one slot from each other, conductor wires in the conductor wire pairs having a non-flat cross-sectional shape covered with a first electrically-insulating coating, each of the conductor wires being formed into a pattern in which straight portions are linked by linking portions and arranged at the predetermined slot pitch and adjacent pairs of the straight portions are offset so as to alternately occupy an inner layer and an outer layer in a slot depth direction by the linking portions, and each of the conductor wire pairs being formed by arranging two of the conductor wires so as to be offset by the predetermined slot pitch from each other with the straight portions superposed. Further, the method for manufacturing a stator for an automotive alternator includes the step of preparing a winding assembly by press forming the straight portions of the winding unit into a flat cross-sectional shape. Furthermore, the method for manufacturing a stator for an automotive alternator includes the step of mounting the winding assembly into a rectangular parallelepiped laminated core by inserting the straight portions of the winding assembly into slots of the laminated core from a slot opening side. Moreover, the method for manufacturing a stator for an automotive alternator includes the step of forming a stator core by bending the laminated core mounted with the winding assembly into an annular shape, abutting end surfaces of the laminated core, and integrating the end surfaces of the laminated core by welding.

Therefore, the number of joints at the end surfaces of the stator core is significantly reduced, thereby there is provided a method for manufacturing a stator for an automotive alternator having a superior rate of production.

The step of preparing the winding assembly may use a die being provided with first press groove portions having a groove width equal to or greater than a width of the straight portions and second press groove portions having a groove width narrower than the width of the straight portions, each of the second press groove portions being disposed so as to extend continuously from one of the first press groove portions in a groove depth direction. The straight portions are deformed into the flat cross-sectional shape by housing the straight portions of the winding unit inside the first press groove portions, and then pressing the straight portions from the first press groove portions into the second press groove portions.

The straight portions of the winding assembly mounted to the laminated core housed in a deepest position in a slot depth direction in the slots may be formed with a cross-sectional shape in which a radius of curvature of corner portions on a slot bottom side is greater than a radius of curvature of corner portions on a slot opening side.

The straight portions of the winding assembly mounted to the laminated core housed in a shallowest position in a slot depth direction in the slots may be formed with a cross-sectional shape in which a radius of curvature of corner portions on a slot opening side is greater than a radius of curvature of corner portions on a slot bottom side.

The step of preparing the winding assembly may include press forming all of the straight portions of the winding unit simultaneously.

The step of preparing the winding assembly may include press forming all of the straight portions of a plurality of the winding units simultaneously.

The method for manufacturing a stator for an automotive alternator may further include the step of applying a second electrically-insulating coating on the straight portions of the winding assembly.

The first electrically-insulating coating may be an adhesion-enhanced resin, and the second electrically-insulating coating may be a heat-tolerant resin.

DETAILED DESCRIPTION OF THE PREFERRED EMBODIMENTS

The preferred embodiments of the present invention will now be explained with reference to the drawings.

Embodiment 1

Figure 1:
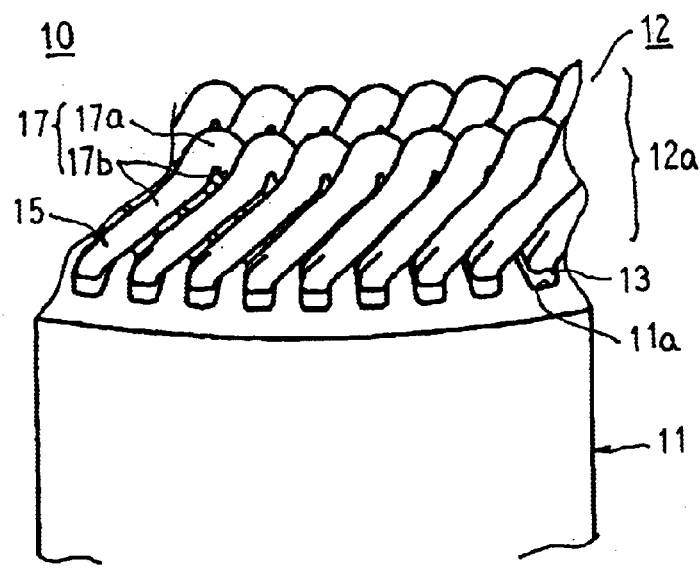
FIG. 1 is a perspective showing part of a stator for an automotive alternator according to Embodiment 1 of the present invention viewed from a first axial end.
Figure 2:
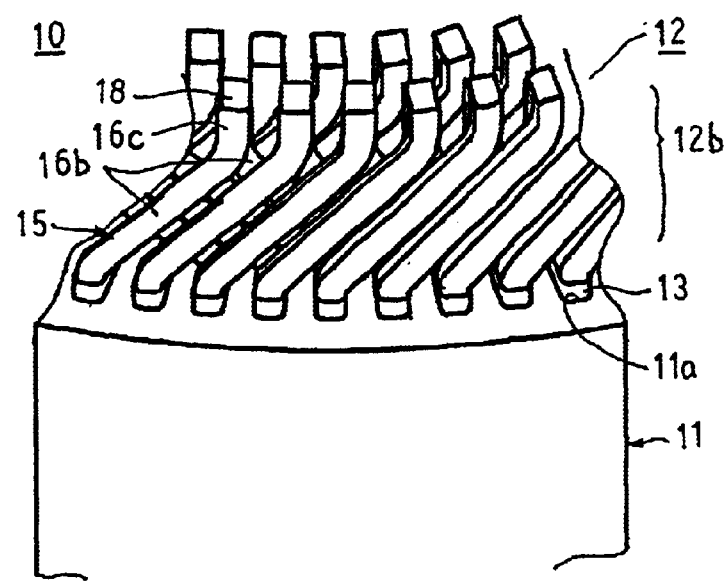
FIG. 2 is a perspective showing part of the stator for an automotive alternator according to Embodiment 1 of the present invention viewed from a second axial end.
Figure 3:
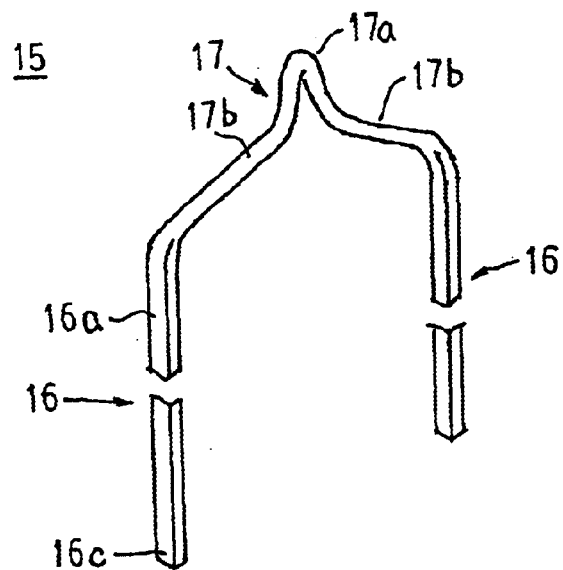
FIG. 3 is a perspective showing a conductor segment used in a stator winding of the stator for an automotive alternator according to Embodiment 1 of the present invention.
Figure 4:
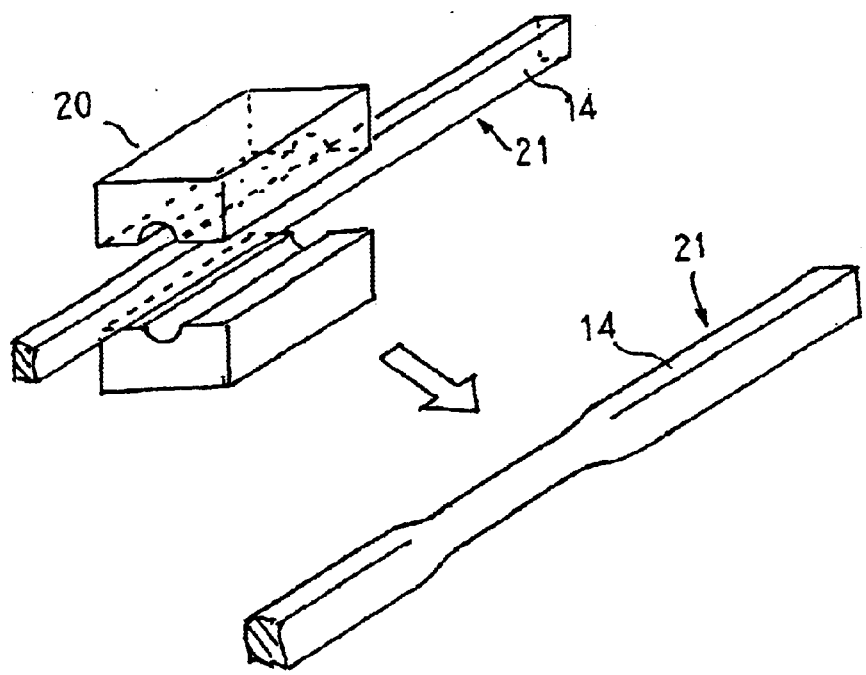
FIG. 4 is a perspective explaining a method for forming the conductor segment shown in FIG. 3.
Figure 5:
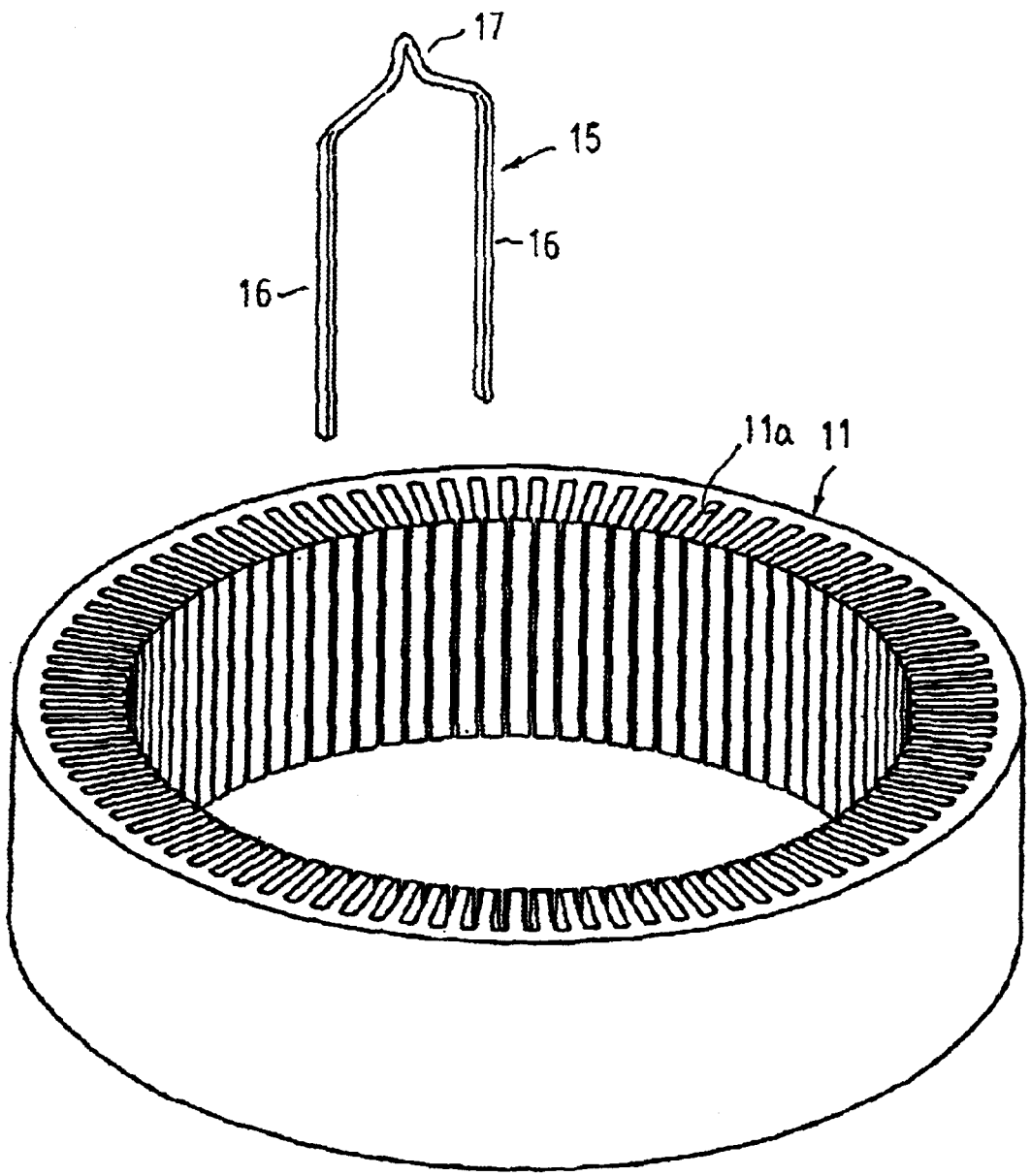
FIG. 5 is a perspective explaining a method for mounting the conductor segment to a stator core of the stator for an automotive alternator according to Embodiment 1 of the present invention.
Figure 6A:
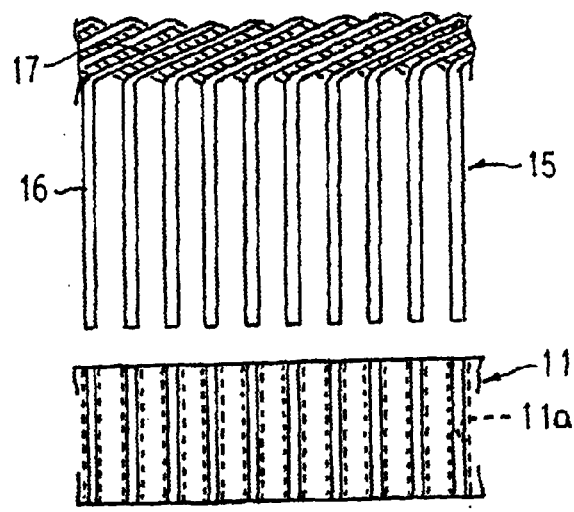
FIG. 6A is a process diagram explaining a method for manufacturing the stator of the automotive alternator according to Embodiment 1 of the present invention.
Figure 6B:
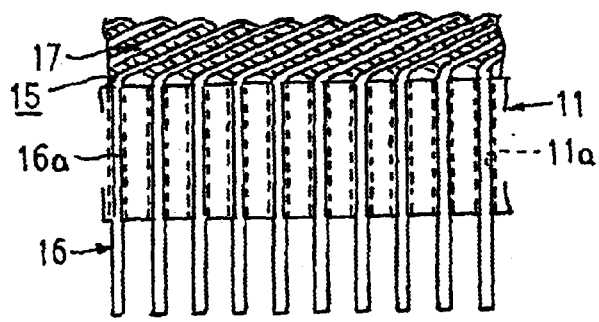
FIG. 6B is another process diagram explaining the method for manufacturing the stator of the automotive alternator according to Embodiment 1 of the present invention.
Figure 6C:
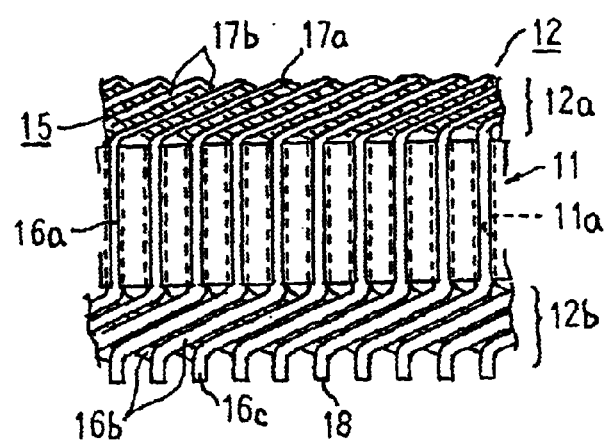
FIG. 6C is still another process diagram explaining the method for manufacturing the stator of the automotive alternator according to Embodiment 1 of the present invention.
Figure 7:
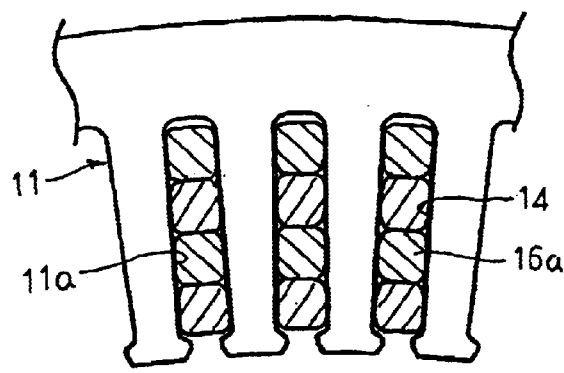
FIG. 7 is a diagram explaining arrangement of conductor segments in slots of the stator core in the stator for an automotive alternator according to Embodiment 1 of the present invention.
Figure 8:
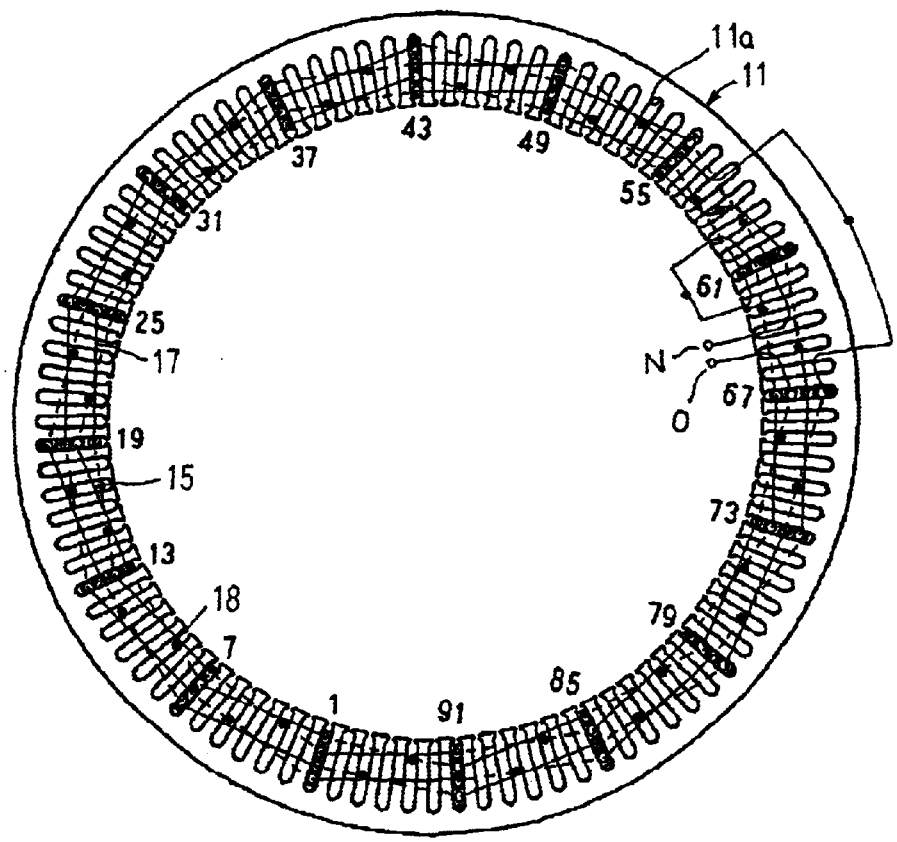
FIG. 8 is an end elevation explaining connections in a first winding phase portion in the stator winding of the stator for an automotive alternator according to Embodiment 1 of the present invention.

FIG. 1 is a perspective showing part of a stator for an automotive alternator according to Embodiment 1 of the present invention viewed from a first axial end, FIG. 2 is a perspective showing part of the stator for an automotive alternator according to Embodiment 1 of the present invention viewed from a second axial end, FIG. 3 is a perspective showing a conductor segment used in a stator winding of the stator for an automotive alternator according to Embodiment 1 of the present invention, FIG. 4 is a perspective explaining a method for forming the conductor segment shown in FIG. 3, FIG. 5 is a perspective explaining a method for mounting the conductor segment to a stator core of the stator for an automotive alternator according to Embodiment 1 of the present invention, FIG. 6A is a process diagram explaining a method for manufacturing the stator of the automotive alternator according to Embodiment 1 of the present invention, FIG. 6B is another process diagram explaining the method for manufacturing the stator of the automotive alternator according to Embodiment 1 of the present invention, FIG. 6C is still another process diagram explaining the method for manufacturing the stator of the automotive alternator according to Embodiment 1 of the present invention, FIG. 7 is a diagram explaining arrangement of conductor segments in slots of the stator core in the stator for an automotive alternator according to Embodiment 1 of the present invention, and FIG. 8 is an end elevation explaining connections in a first winding phase portion in the stator winding of the stator for an automotive alternator according to Embodiment 1 of the present invention. Moreover, in FIG. 8, solid lines indicate connections at a first end of a stator core, broken lines indicate connections at a second end of the stator core, black dots indicate joint portions, and 1, 7, 13, etc., through 91 represent slot numbers.

In each of the figures, a stator 10 is constituted by: a stator core 11 formed with a plurality of slots 11a; a stator winding 12 installed in the stator core 11; and an insulator 13 mounted inside each of the slots 11a of the stator core 11.

The stator core 11 is composed of a laminated core formed into a cylindrical shape, the plurality of slots 11a extending in an axial direction and being formed at a predetermined pitch in a circumferential direction so as to open onto an inner circumferential side. Here, the stator 10 is used in an alternator having a rotor in which the number of magnetic poles is sixteen, ninety-six slots 11a being formed in the stator core 11. In other words, the slots 11a are formed at a ratio of two per phase per pole. In this case, a pitch of six slots corresponds to a pitch of one magnetic pole.

The stator winding 12 is constituted by a plurality of winding phase portions each formed into a wave winding in which a large number of conductor segments 15 each formed into a U shape are inserted two at a time from a first axial end of the stator core 11 into pairs of slots 11a separated by six slots and end portions of the conductor segments 15 extending outward from a second axial end of the stator core 11 are joined together.

The conductor segments 15 are each formed into a general U shape in which a pair of straight portions 16 are joined by a linking portion 17. The straight portions 16 have a rectangular cross section, and the linking portion 17 has a circular cross section.

Moreover, in each of the slots 11a, slot-housed portions of four of the conductor segments 15 are arranged in a single row in order of Address 1, Address 2, Address 3, and Address 4 from a radially-inner side.

Next, a method for manufacturing the stator 10 will be explained.

First, as shown in FIG. 4, a central portion of a short length of copper wire material 21 having a rectangular cross section coated with an electrically-insulating coating 14 is pressed and deformed into a circular cross section using a press jig 20. Then, the conductor segment 15 shown in FIG. 3 is prepared by bending the central portion of the copper wire material 21.

Next, as shown in FIG. 5 and FIG. 6A, two conductor segments 15 are inserted from the first axial end of the stator core 11 into each of the pairs of slots 11a separated by six slots (a pitch of one magnetic pole). Hence, as shown in FIG. 7, the slot-housed portions 16a of the straight portions 16 of the conductor segments 15 are housed so as to line up in single rows inside each of the slots 11a with the longitudinal axes of the rectangular cross sections thereof aligned radially. Moreover, the insulators 13 are not shown in FIG. 7, but each of the slot-housed portions 16a is placed in close contact with side wall surfaces of the slots 11a by means of the insulators 13.

Tips of the straight portions 16 of the conductor segments 15 extend outward from each of the slots 11a at the second end surface of the stator core 11, as shown in FIG. 6B. The tips of the straight portions 16 of each of the conductor segments 15 extending outward at the second end surface of the stator core 11 are bent away from each other in a circumferential direction.

Next, as shown in FIG. 8, in a slot group including Slot Numbers 1, 7, etc., through 91, the end portions 16c of the conductor segments 15 extending outward from Address 2 of Slot Numbers m of the slots 11a and the end portions 16c of the conductor segments 15 extending outward from Address 1 of Slot Numbers (m+6) of the slots 11a are stacked in a radial direction and joined together by tungsten-inert gas (TIG) welding to prepare two single-turn wave windings. Similarly, the end portions 16c of the conductor segments 15 extending outward from Address 4 of Slot Numbers m of the slots 11a and the end portions 16c of the conductor segments 15 extending outward from Address 3 of Slot Numbers (m+6) of the slots 11a are stacked in a radial direction and joined together by TIG welding to prepare two single-turn wave windings.

Next, the linking portions 17 of the two conductor segments 15 inserted into the pair of slots 11a including Slot Number 55 and Slot Number 61 are cut and the linking portions 17 of the two conductor segments 15 inserted into the pair of slots 11a including Slot Number 61 and Slot Number 67 are cut. The cut end of the conductor segment 15 extending outward from Address 1 of Slot Number 55 of the slots 11a and the cut end of the conductor segment 15 extending outward from Address 4 of Slot Number 61 of the slots 11a are joined together by TIG welding, the cut end of the conductor segment 15 extending outward from Address 3 of Slot Number 55 of the slots 11a and the cut end of the conductor segment 15 extending outward from Address 4 of Slot Number 67 of the slots 11a are joined together by TIG welding, and the cut end of the conductor segment 15 extending outward from Address 1 of Slot Number 61 of the slots 11a and the cut end of the conductor segment 15 extending outward from Address 2 of Slot Number 61 of the slots 11a are joined together by TIG welding. Hence, a first winding phase portion is obtained in which four single-turn wave windings are connected in series. The cut end of the conductor segment 15 extending outward from Address 2 of Slot Number 67 of the slots 11a and the cut end of the conductor segment 15 extending outward from Address 3 of Slot Number 61 of the slots 11a become an output wire (O) and a neutral point (N), respectively, of the first winding phase portion.

Although not all shown, a total of six (first to sixth) winding phase portions are prepared by similarly connecting conductor segments 15 mounted to a slot group including Slot Numbers 2, 8, etc., through 92, a slot group including Slot Numbers 3, 9, etc., through 93, a slot group including Slot Numbers 4, 10, etc., through 94, a slot group including Slot Numbers 5, 11, etc., through 95, and a slot group including Slot Numbers 6, 12, etc., through 96, respectively.

In addition, the first winding phase portion installed in the slot group including Slot Numbers 1, 7, etc., through 91, the third winding phase portion installed in the slot group including Slot Numbers 3, 9, etc., through 93, and the fifth winding phase portion installed in the slot group including Slot Numbers 5, 11, etc., through 95 are formed into a Y connection (an alternating-current connection) by joining together the neutral points N thereof, and the second winding phase portion installed in the slot group including Slot Numbers 2, 8, etc., through 92, the fourth winding phase portion installed in the slot group including Slot Numbers 4, 10, etc., through 94, and the sixth winding phase portion installed in the slot group including Slot Numbers 6, 12, etc., through 96 are formed into a Y connection in a similar manner to prepare two three-phase alternating-current windings and obtain the stator 10, as shown in FIGS. 1, 2, and 6C. Moreover, the two three-phase alternating-current windings constitute the stator winding 12.

In the stator winding 12 constructed in this manner, slot-housed portions 16a having a rectangular cross section are arranged so as to line up in single rows in a slot depth direction inside each of the slots 11a with the flat surfaces thereof brought into close contact with the side wall surfaces of each of the slots 11a by means of the insulators 13.

In each of the pairs of slots ha separated by six slots, at the first axial end of the stator core 11, the slot-housed portions 16a housed in Address 1 and Address 2 of the pair of slots 11a are connected in series by a linking portion 17 having a circular cross section, and the slot-housed portions 16a housed in Address 3 and Address 4 of the pair of slots 11a are connected in series by a linking portion 17 having a circular cross section. Here, the linking portions 17 are each constituted by: a return portion 17a; and a pair of first inclined portions 17b connecting the return portion 17a and each of the slot-housed portions 16a, together forming first coil ends. Two rows of the first coil ends are arranged in a circumferential direction at a pitch of one slot, constituting a first coil end group 12a. Hence, the first coil ends are arranged neatly in rows in a circumferential direction so as to be separated from each other in a radial direction and a circumferential direction.

Similarly, in each of the pairs of slots 11a separated by six slots, at the second axial end of the stator core 11, the slot-housed portions 16a housed in Address 2 and Address 1 of the pair of slots 11a are connected in series by joining projecting ends of the straight portions 16, and the slot-housed portions 16a housed in Address 4 and Address 3 of the pair of slots 11a are connected in series by joining projecting ends of the straight portions 16. Here, the second coil ends formed by joining the projecting ends of the straight portions 16 are each constituted by: a joint portion 18 joining together the end portions 16c of the straight portions 16; and a pair of second inclined portions 16b connecting the joint portion 18 and each of the slot-housed portions 16a. Two rows of the second coil ends are arranged in a circumferential direction at a pitch of one slot, constituting a second coil end group 12b. Hence, the second coil ends are arranged neatly in rows in a circumferential direction so as to be separated from each other in a radial direction and a circumferential direction.

Hence, according to Embodiment 1, because the slot-housed portions 16a of the conductor segments 15 are formed with a rectangular cross section, the space factor of the conductors in the slots 11a can be increased. Because the first and second coil end groups 12a and 12b are constructed at the first and second ends of the stator core 11 by arranging the two rows of first and second coil ends in a circumferential direction at a pitch of one slot, the first and second coil ends connecting in series the slot-housed portions 16a housed in different addresses in slots 11a separated by six slots at the first and second ends of the stator core 11, respectively, alignment in rows and increased density in the first and second coil end groups 12a and 12b is enabled. As a result, a stator which can achieve compactness and high output is obtained.

Because the linking portions 17 corresponding to the first coil ends are formed with a circular cross section, stresses arising in the return portions 17a of the linking portions 17 (the bent portions) when the copper wire material 21 is bent into the U shape are reduced, suppressing damage to the electrically-insulating coating 14 covering the return portions 17a, thereby enabling electrical insulation to be improved.

Because the linking portions 17 are formed with a circular cross section, even if the linking portions 17 (the first coil ends) come into contact with each other during assembly of the stator winding 12 or due to vibrations generated during operation of an actual machine mounted with the stator 10, damage to the electrically-insulating coating 14 is suppressed, enabling electrical insulation to be improved.

Because the output wires O and the neutral points N of the stator winding 12 are formed with a circular cross section, removal of the electrically-insulating coating 14 is simplified. Thus, when the stator 10 is mounted to an alternator, connection between the output wires O of the stator 10 and a rectifier can be performed simply and reliably.

Moreover, Embodiment 1 above is explained using a stator winding 12 constituted by a wave winding, but similar effects can also be achieved if the present invention is applied to a stator winding constituted by a lap winding.

Embodiment 1 above has been explained for cases in which two conductor segments 15 each are inserted into pairs of slots 11a separated by six slots, but the number of conductor segments 15 inserted into the pairs of slots 11a separated by six slots is not limited to two; the number may also be one, or three or more. However, the number of slot-housed portions 16a housed inside the slots 11a is an even number.

Embodiment 1 above has been explained for cases in which conductor segments 15 are inserted into pairs of slots 11a separated by six slots, but the present invention is not limited to this configuration; in cases in which the slots are formed at a ratio of one per phase per pole, the conductor segments 15 may be inserted into pairs of slots 11a separated by three slots.

In Embodiment 1 above, central portions of short lengths of the copper wire material 21 are deformed into a circular cross section one at a time by the press jig 20, but the central portions of a large number of short lengths of the copper wire material 21 may also be deformed into a circular cross section simultaneously by the press jig 20. In that case, the manufacturing process is simplified, enabling manufacturing time to be shortened.

Embodiment 2

Figure 9:
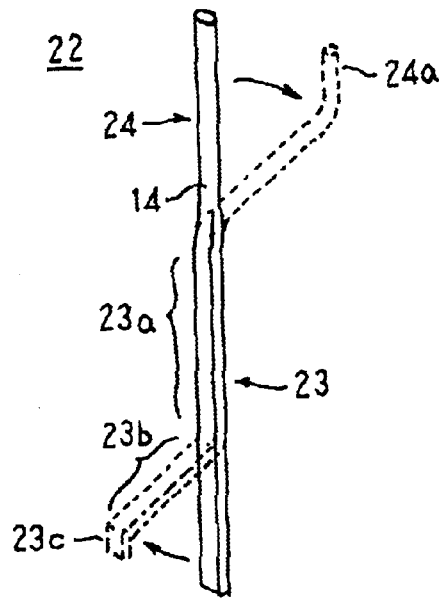
FIG. 9 is a perspective showing a modified conductor segment used in a stator winding of a stator for an automotive alternator according to Embodiment 2 of the present invention.

In Embodiment 2, the stator winding is constituted by a combination of the conductor segments 15 and modified conductor segments 22. The modified conductor segments 22 are used in positions where four wave windings constituting each of the winding phase portions are connected in series. As shown in FIG. 9, these modified conductor segments 22 are prepared by pressing and deforming into a circular cross section a first end of a short length of a copper wire material having a rectangular cross section coated with the electrically-insulating coating 14 using the press jig 20.

Here, if explained with reference to FIG. 8, the modified conductor segments 22 are mounted into Address 1 and Address 3 of Slot Number 55 of the slots 11a, Addresses 1 to 4 of Slot Number 61 of the slots 11a, and Address 2 and Address 4 of Slot Number 67 of the slots 11a, respectively. Each of the modified conductor segments 22 are inserted into the slots 11a then bent as indicated by the arrows in FIG. 9. In the rest of the pairs of slots 11a, the conductor segments 15 are inserted in a similar manner to Embodiment 1 above. Moreover, the modified conductor segments 22 have inclined portions 23b and end portions 23c equivalent to the second inclined portions 16b and the end portions 16c of the conductor segments 15 formed by bending the tip of a rectangular cross section portion 23, a remaining portion of the rectangular cross section portion 23 forming a slot-housed portion 23a. A circular cross section portion 24 is bent so as not to come into contact with the linking portions 17 of the conductor segments 15.

At the second end surface of the stator core 11, the end portions 23c of the modified conductor segments 22 extending outward from Address 1 and Address 3 of Slot Number 55 of the slots 11a and the end portions 16c of the conductor segments 15 extending outward from Address 2 and Address 4 of Slot Number 49 of the slots 11a are joined together. The end portions 23c of the modified conductor segments 22 extending outward from Address 1 and Address 3 of Slot Number 61 of the slots 11a and the end portions 16c of the conductor segments 15 extending outward from Address 2 and Address 4 of Slot Number 55 of the slots 11a are joined together. The end portions 23c of the modified conductor segments 22 extending outward from Address 2 and Address 4 of Slot Number 61 of the slots 11a and the end portions 16c of the conductor segments 15 extending outward from Address 1 and Address 3 of Slot Number 67 of the slots 11a are joined together. And the end portions 23c of the modified conductor segments 22 extending outward from Address 2 and Address 4 of Slot Number 67 of the slots 11a and the end portions 16c of the conductor segments 15 extending outward from Address 1 and Address 3 of Slot Number 73 of the slots 11a are joined together.

Next, at the first end surface of the stator core 11, the end portion 24a of the modified conductor segment 22 extending outward from Address 1 of Slot Number 55 of the slots 11a and the end portion 24a of the modified conductor segment 22 extending outward at the first end surface from Address 4 of Slot Number 61 of the slots 11a are joined together, the end portion 24a of the modified conductor segment 22 extending outward from Address 3 of Slot Number 55 of the slots 11a and the end portion 24a of the modified conductor segment 22 extending outward from Address 4 of Slot Number 67 of the slots 11a are joined together, and the end portion 24a of the modified conductor segment 22 extending outward from Address 1 of Slot Number 61 of the slots 11a and the end portion 24a of the modified conductor segment 22 extending outward from Address 2 of Slot Number 61 of the slots 11a are joined together.

Hence, in a similar manner to Embodiment 1 above, a first winding phase portion is obtained in which four single-turn wave windings are connected in series. The end portion 24a of the modified conductor segment 22 extending outward at the first end surface from Address 2 of Slot Number 67 of the slots 11a and the end portion 24a of the modified conductor segment 22 extending outward at the first end surface from Address 3 of Slot Number 61 of the slots 11a become an output wire (O) and a neutral point (N), respectively, of the first winding phase portion.

Moreover, five other winding phase portions are constructed in a similar manner.

Consequently, according to Embodiment 2, because the modified conductor segments 22 are used, it is not necessary to cut the conductor segments 15 when the four wave windings constituting each of the winding phase portions are being connected in series, thereby improving connection operations.

Embodiment 3

Figure 10:
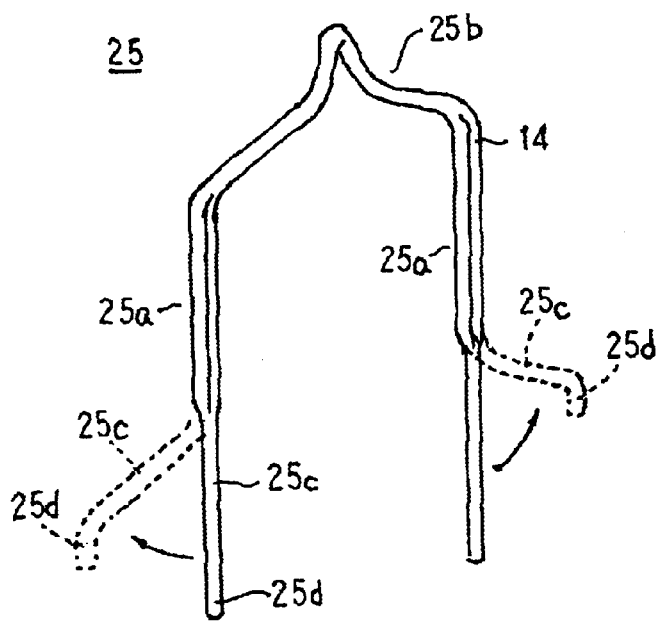
FIG. 10 is a perspective showing a conductor segment used in a stator winding of a stator for an automotive alternator according to Embodiment 3 of the present invention.

In Embodiment 3, conductor segments 25 are used in which a central portion and first and second end portions of a short length of copper wire material having a rectangular cross section coated with the electrically-insulating coating 14 are pressed by the press jig 20 and deformed into a circular cross section and then the central portion of the copper wire material is bent to form a U shape. In these conductor segments 25, slot-housed portions 25a are formed with a rectangular cross section, linking portions 25b constituting the first coil ends are formed with a circular cross section, and inclined portions 25c and end portions 25d constituting the second coil ends are formed with a circular cross section, as shown in FIG. 10. Moreover, except for the fact that the conductor segments 25 are used in place of the conductor segments 15, this embodiment is constructed in a similar manner to Embodiment 1 above.

According to Embodiment 3, because the second coil ends are constituted by conductors having a circular cross section, damage to the electrically-insulating coating 14 is suppressed even if the second coil ends come into contact with each other during assembly of the stator winding or due to vibrations generated during operation of an actual machine mounted with the stator. Consequently, damage to the electrically-insulating coating 14 in the first coil end group and the second coil end group is suppressed, achieving superior electrical insulation.

Embodiment 4

Figure 11:
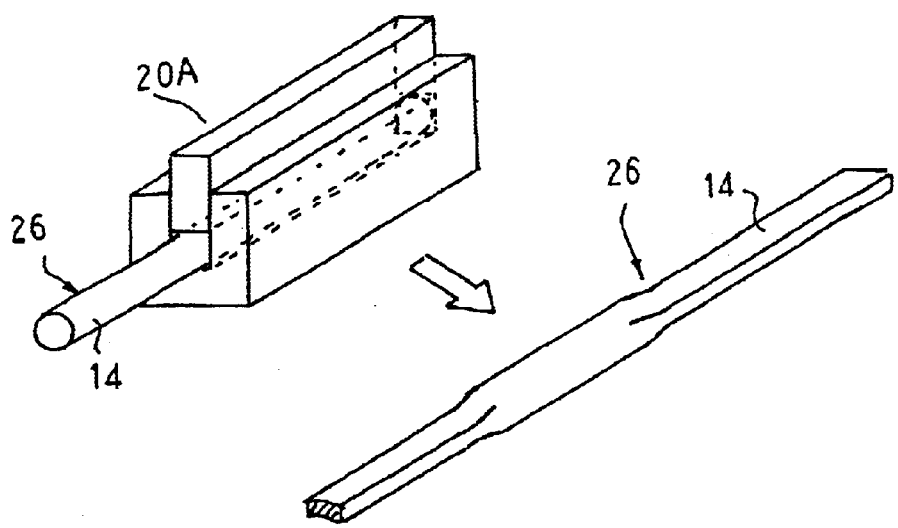
FIG. 11 is a perspective explaining a method for forming a conductor segment used in a stator winding of a stator for an automotive alternator according to Embodiment 4 of the present invention.

In Embodiment 4, as shown in FIG. 11, first and second ends of a short length of a copper wire material 26 having a circular cross section coated with the electrically-insulating coating 14 are pressed by a press jig 20A and formed into a rectangular cross section, then a central portion of the copper wire material 26 is bent to prepare a U-shaped conductor segment.

Moreover, except for the fact that the copper wire material 26 constituting the conductor segments has a circular cross section, this embodiment is constructed in a similar manner to Embodiment 1 above.

Consequently, according to Embodiment 4, because the conductor segments are prepared using a copper wire material having a circular cross section, the cost is cheaper than for the copper wire material 21 having a rectangular cross section, enabling the stator to be prepared at reduced cost.

Because the slot-housed portions are press formed, the hardness of the slot-housed portions is greater than that of the linking portions. Thus, the linking portions functioning as the first coil ends are easily deformed, and even if the linking portions come into contact, damage to the electrically-insulating coating 14 is less likely to occur, improving electrical insulation.

Moreover, in Embodiment 4 above, hardness is increased by forming the slot-housed portions by press working, but the means of increasing the hardness of the slot-housed portions relative to the hardness of the linking portions is not limited to press working.

Embodiment 5

Figure 12:
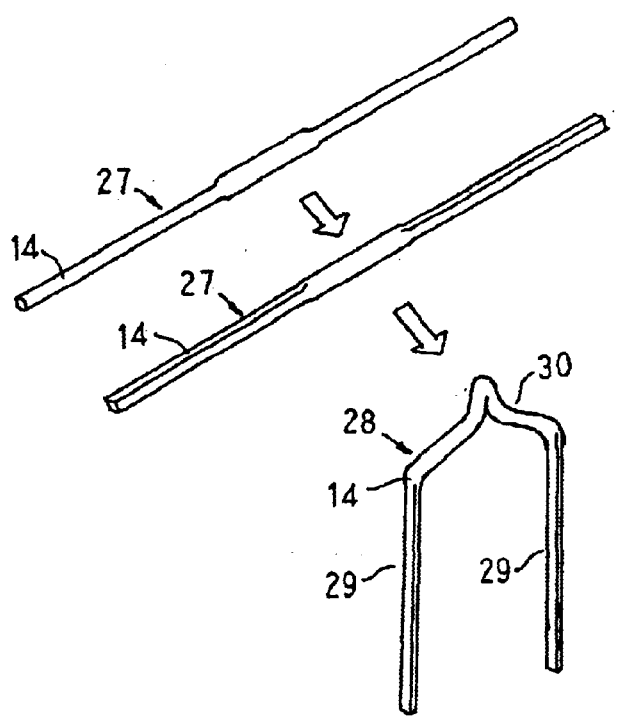
FIG. 12 is a perspective explaining a method for forming a conductor segment used in a stator winding of a stator for an automotive alternator according to Embodiment 5 of the present invention.

In Embodiment 5, as shown in FIG. 12, first, a short length of the copper wire material 27 having a circular cross section coated with an electrically-insulating coating 14 in which the diameter of a central portion is enlarged is prepared, then portions of the copper wire material 27 other than the central portion are deformed into a rectangular cross section by press working. Thereafter, a U-shaped conductor segment 28 in which a pair of straight portions 29 are connected by a linking portion 30 is prepared by bending the central portion of the copper wire material 27. In this conductor segment 28, the cross-sectional area of the linking portion 30 is formed larger than the cross-sectional area of the straight portions 29.

Moreover, except for the fact that the conductor segments 28 are used in place of the conductor segments 15, this embodiment is constructed in a similar manner to Embodiment 1 above.

According to Embodiment 5, the cross-sectional area of the first coil ends constituted by the linking portions 30 is formed larger than the cross-sectional area of the slot-housed portions constituted by the straight portions 29. Thus, when the stator is mounted to an alternator, because the amount of heat generated in the first coil ends is suppressed, reductions in the size of a cooling fan provided to cool the coil end groups are made possible, enabling reductions in the size of the alternator.

Embodiment 6

Figure 13:
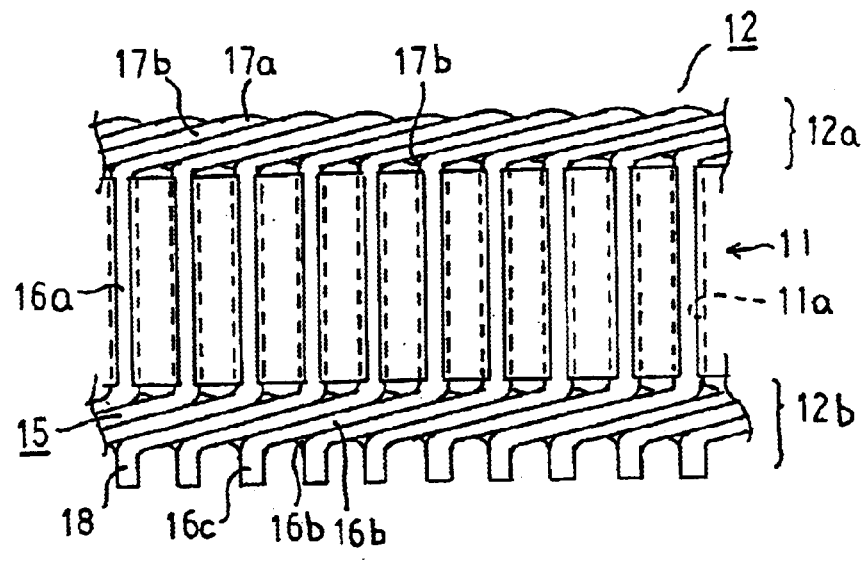
FIG. 13 is a plan showing part of a stator for an automotive alternator according to Embodiment 6 of the present invention viewed from a inner circumferential side.

In Embodiment 6, as shown in FIG. 13, in the first coil end group 12a, circumferentially-adjacent pairs of the first inclined portions 17b are arranged so as to be in contact with each other in a circumferential direction, and in the second coil end group 12b, circumferentially-adjacent pairs of the second inclined portions 16b are arranged so as to be in contact with each other in a circumferential direction.

Moreover, the rest of this embodiment is constructed in a similar manner to Embodiment 1 above.

According to Embodiment 6, because circumferentially-adjacent pairs of the first and second inclined portions 16b and 17b are arranged without gaps, the inclination of the first and second inclined portions 16b and 17b relative to the axial direction of the stator core 11 is increased, lowering the axial height of the first and second coil end groups 12a and 12b. As a result, when mounted to an alternator, ventilation resistance in the first and second coil end groups 12a and 12b is reduced. As a result, the cooling airflow rate generated by a cooling fan is increased and the first and second coil end groups 12a and 12b are cooled efficiently, suppressing temperature increases in the stator, thereby enabling increased output from the alternator.

Embodiment 7

Figure 14:
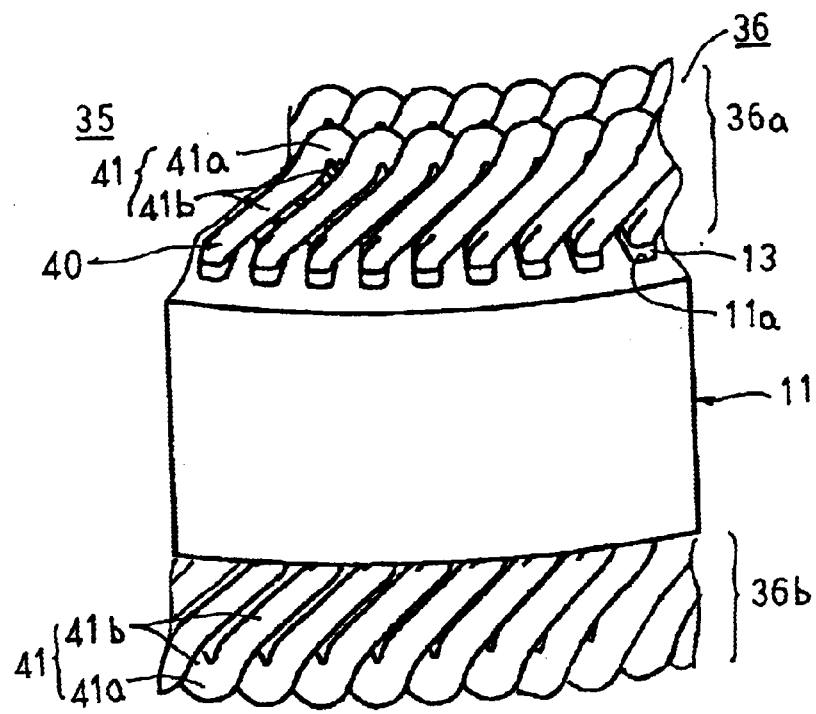
FIG. 14 is a perspective showing part of a stator for an automotive alternator according to Embodiment 7 of the present invention.
Figure 15:
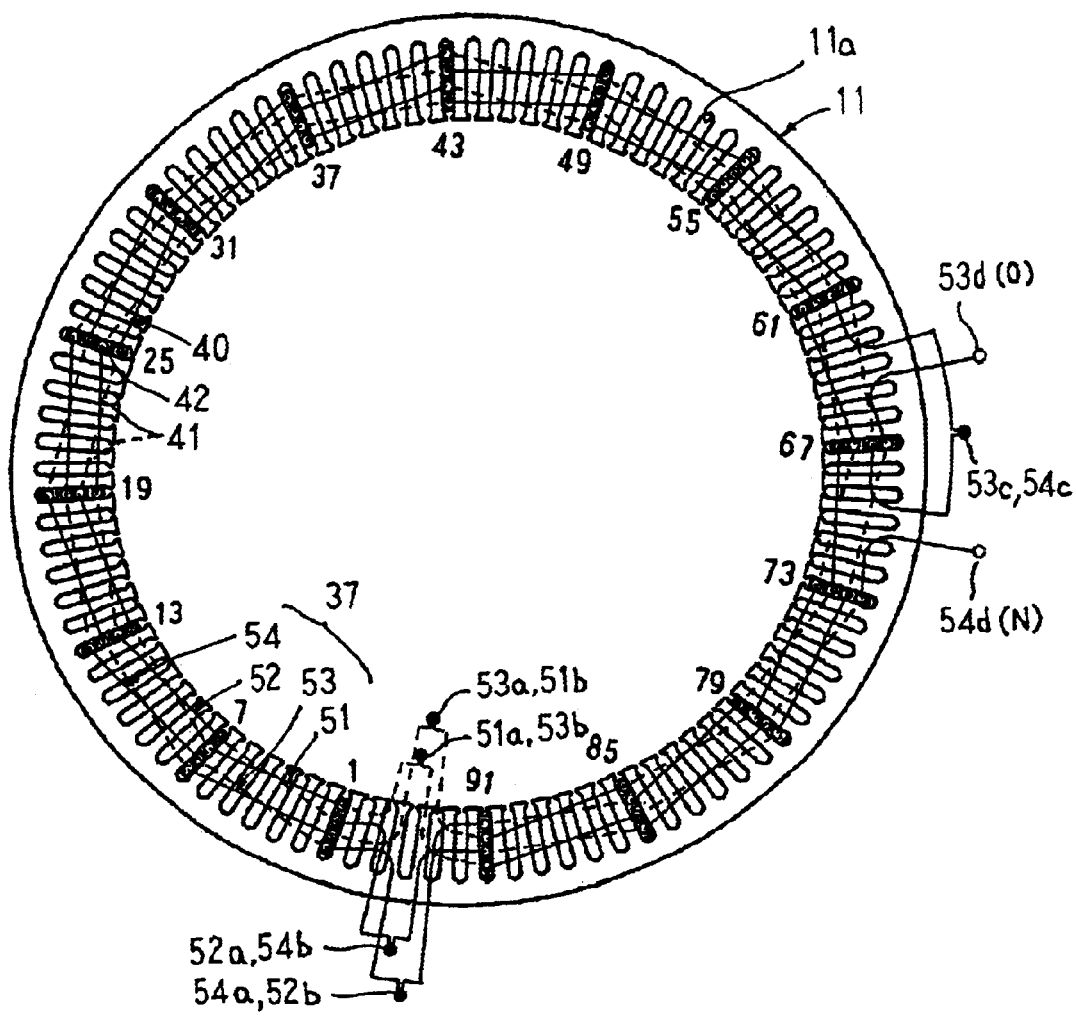
FIG. 15 is an end elevation explaining connections in a first winding phase portion in a stator winding of the stator for an automotive alternator according to Embodiment 7 of the present invention.
Figure 16:
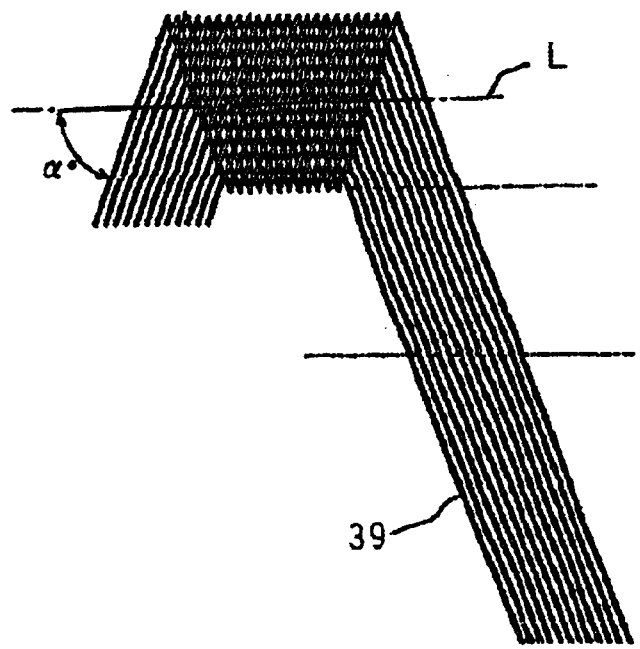
FIG. 16 is a diagram explaining a method for manufacturing a winding assembly used in the stator winding of the stator for an automotive alternator according to Embodiment 7 of the present invention.
Figure 17:
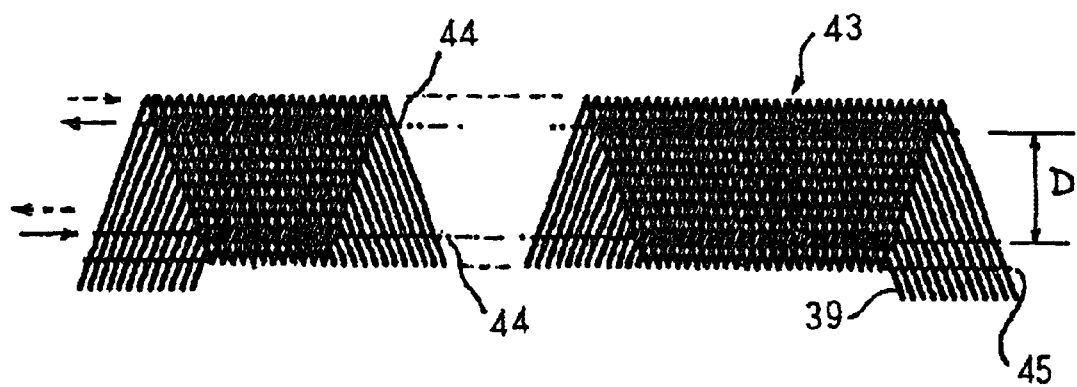
FIG. 17 is another diagram explaining the method for manufacturing the winding assembly used in the stator winding of the stator for an automotive alternator according to Embodiment 7 of the present invention.
Figure 18A:
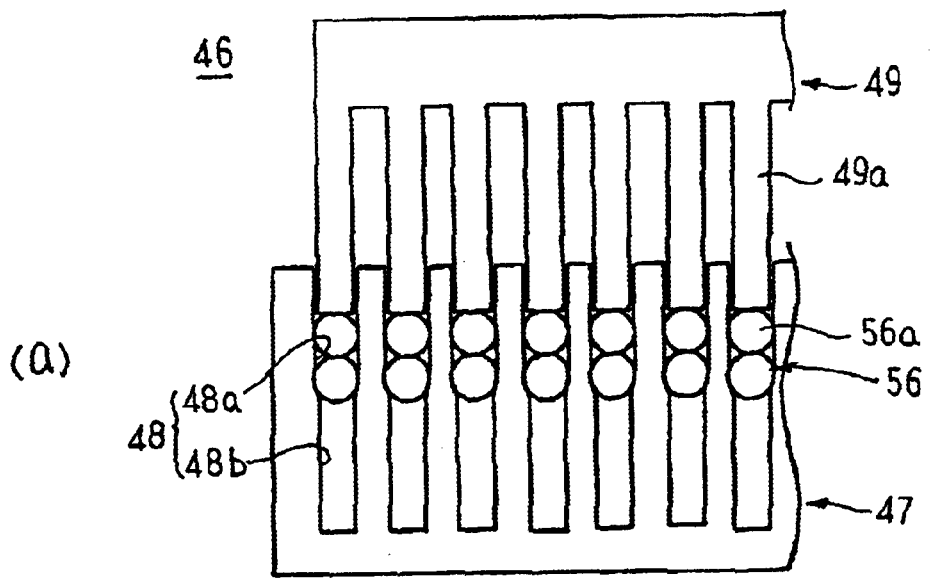
FIG. 18A is still another diagram explaining the method for manufacturing the winding assembly used in the stator winding of the stator for an automotive alternator according to Embodiment 7 of the present invention.
Figure 18B:
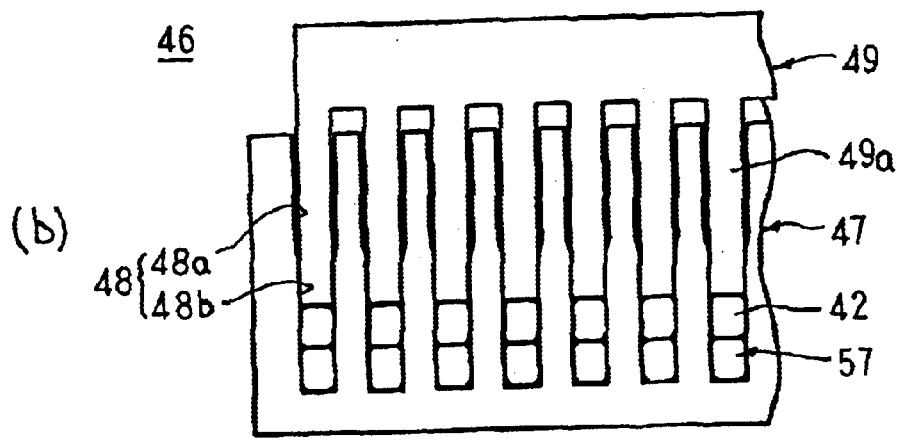
FIG. 18B is a further diagram explaining the method for manufacturing the winding assembly used in the stator winding of the stator for an automotive alternator according to Embodiment 7 of the present invention.
Figure 19:
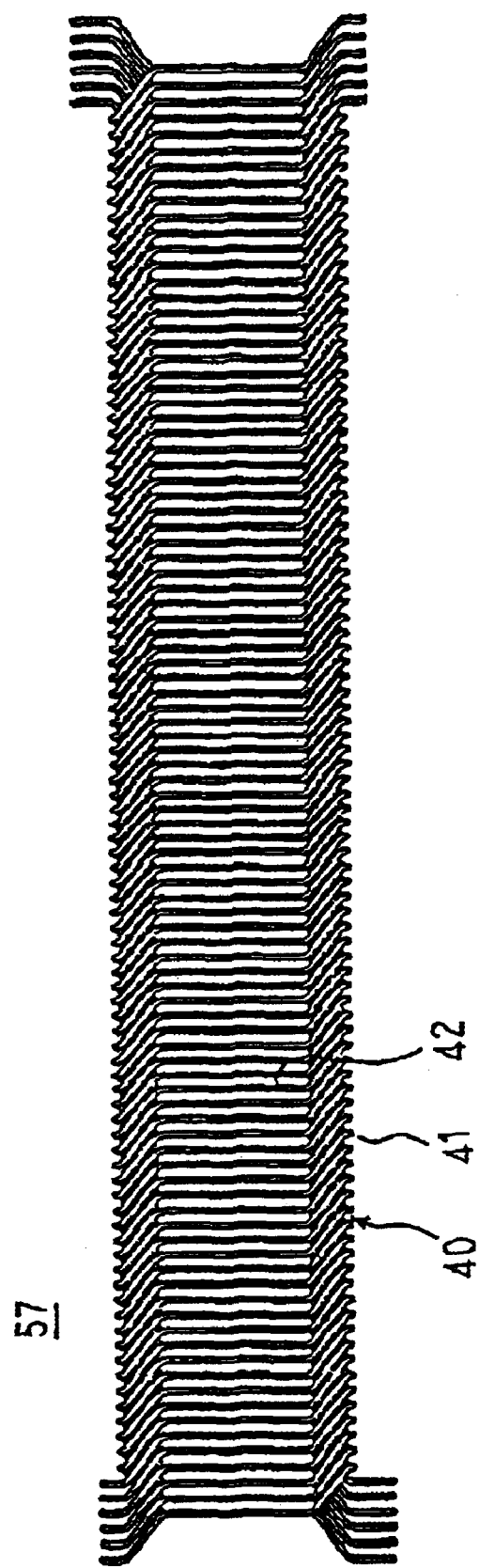
FIG. 19 is a side elevation showing the winding assembly used in the stator winding of the stator for an automotive alternator according to Embodiment 7 of the present invention.
Figure 20:
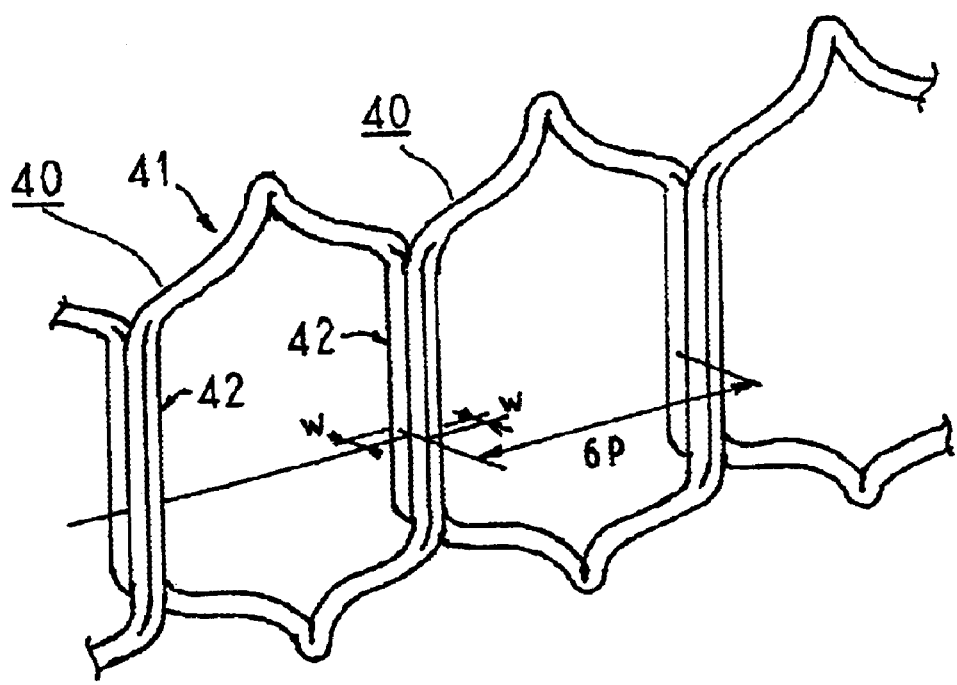
FIG. 20 is a perspective explaining a winding construction of the winding assembly used in the stator winding of the stator for an automotive alternator according to Embodiment 7 of the present invention.
Figure 21A:
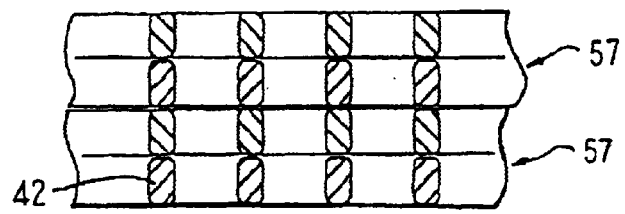
FIG. 21A is a process cross section explaining a method for manufacturing the stator of the automotive alternator according to Embodiment 7 of the present invention.
Figure 21B:
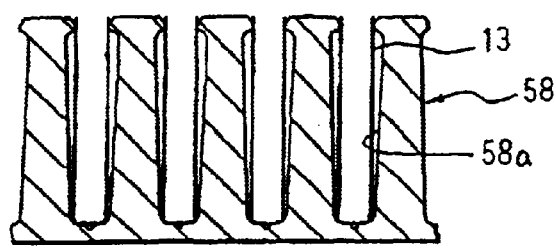
FIG. 21B is another process cross section explaining the method for manufacturing the stator of the automotive alternator according to Embodiment 7 of the present invention.
Figure 21C:
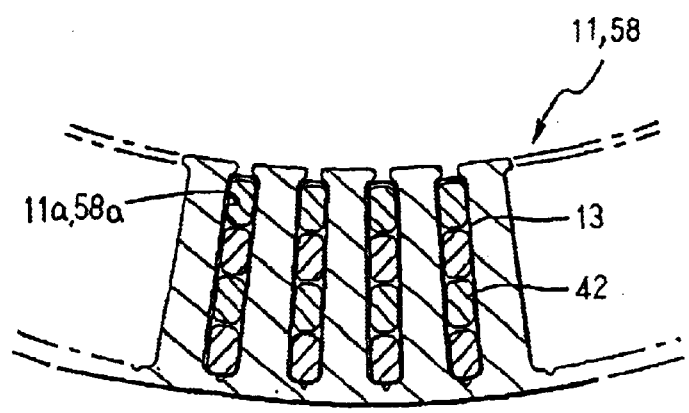
FIG. 21C is still another process cross section explaining the method for manufacturing the stator of the automotive alternator according to Embodiment 7 of the present invention.

FIG. 14 is a perspective showing part of a stator for an automotive alternator according to Embodiment 7 of the present invention, FIG. 15 is an end elevation explaining connections in a first winding phase portion in a stator winding of the stator for an automotive alternator according to Embodiment 7 of the present invention, FIG. 16 is a diagram explaining a method for manufacturing a winding assembly used in the stator winding of the stator for an automotive alternator according to Embodiment 7 of the present invention, FIG. 17 is another diagram explaining the method for manufacturing the winding assembly used in the stator winding of the stator for an automotive alternator according to Embodiment 7 of the present invention, FIG. 18A is still another diagram explaining the method for manufacturing the winding assembly used in the stator winding of the stator for an automotive alternator according to Embodiment 7 of the present invention, FIG. 18B is a further diagram explaining the method for manufacturing the winding assembly used in the stator winding of the stator for an automotive alternator according to Embodiment 7 of the present invention, FIG. 19 is a side elevation showing the winding assembly used in the stator winding of the stator for an automotive alternator according to Embodiment 7 of the present invention, FIG. 20 is a perspective explaining a winding construction of the winding assembly used in the stator winding of the stator for an automotive alternator according to Embodiment 7 of the present invention, FIG. 21A is a process cross section explaining a method for manufacturing the stator of the automotive alternator according to Embodiment 7 of the present invention, FIG. 21B is another process cross section explaining the method for manufacturing the stator of the automotive alternator according to Embodiment 7 of the present invention, and FIG. 21C is still another process cross section explaining the method for manufacturing the stator of the automotive alternator according to Embodiment 7 of the present invention. Moreover, in FIG. 15, solid lines indicate connections at the first end of the stator core, broken lines indicate connections at the second end of the stator core, black dots indicate joint portions, and 1, 7, 13, etc., through 91 represent slot numbers.

In FIG. 14, a stator 35 is constituted by: a stator core 11 composed of a laminated core formed into a cylindrical shape, a plurality of slots 11a extending in an axial direction being formed in the stator core 11 at a predetermined pitch in a circumferential direction so as to open onto an inner circumferential side; a stator winding 36 formed by installing a plurality of continuous conductor wires in the slots 11a; and an insulator 13 mounted to each of the slots 11a.

The stator winding 36 is provided with a plurality of winding phase portions in each of which one conductor wire 40 is installed into a wave winding so as to fold over outside the slots 11a at first and second end surfaces of the stator core 11 and alternately occupy an inner layer and an outer layer in a slot depth direction in every sixth slot of the slots 11a.

Here, a copper wire material 60 covered with an electrically-insulating coating is used for the conductor wires 40. Portions of the conductor wires 40 housed inside the slots 11a (slot-housed portions 42) have a rectangular cross section, and linking portions 41 of the conductor wires 40 each connecting in series a slot-housed portion in the inner layer in a first slot 11a and a slot-housed portion in the outer layer in a second slot 11a six slots away at the first and the second end surfaces of the stator core 11 have a circular cross section. The linking portions 41 are each constituted by: a return portion 41a; and a pair of inclined portions 41b connecting the return portion 41a and each of the slot-housed portions 42, the linking portions at the first and second end surfaces of the stator core 11 forming first and second coil ends, respectively.

Next, a winding construction of a first winding phase portion 37 constituting the stator winding 36 will be explained in detail with reference to FIG. 15.
<155:0060:P2:LL1-4>

The first winding phase portion 37 is constituted by first to fourth winding sub-portions 51 to 54 each composed of one conductor wire 40. The first winding sub-portion 51 is constructed by wave winding one conductor wire 40 into every sixth slot from Slot Numbers 1 to 91 so as to alternately occupy Address 1 and Address 2 in the slots 11a. The second winding sub-portion 52 is constructed by wave winding a conductor wire 40 into every sixth slot from Slot Numbers 1 to 91 so as to alternately occupy Address 2 and Address 1 in the slots 11a. The third winding sub-portion 53 is constructed by wave winding a conductor wire 40 into every sixth slot from Slot Numbers 1 to 91 so as to alternately occupy Address 3 and Address 4 in the slots 11a. The fourth winding sub-portion 54 is constructed by wave winding a conductor wire 40 into every sixth slot from Slot Numbers 1 to 91 so as to alternately occupy Address 4 and Address 3 in the slots 11a. In each of the slots 11a, four slot housed portions 42 of the conductor wires 40 are arranged so as to line up in a single row in a radial direction with longitudinal axes of the rectangular cross sections thereof aligned radially.

At the first end surface of the stator core 11, a winding start end portion 52a of the second winding sub-portion 52 extending outward from Address 2 of Slot Number 1 of the slots 11a and a winding finish end portion 54b of the fourth winding sub-portion 54 extending outward from Address 3 of Slot Number 91 of the slots 11a are TIG welded, and a winding start end portion 54a of the fourth winding sub-portion 54 extending outward from Address 4 of Slot Number 1 of the slots 11a and a winding finish end portion 52b of the second winding sub-portion 52 extending outward from Address 1 of Slot Number 91 of the slots 11a are TIG welded, forming a first two-turn winding.

At the second end surface of the stator core 11, a winding start end portion 51a of the first winding sub-portion 51 extending outward from Address 1 of Slot Number 1 of the slots 11a and a winding finish end portion 53b of the third winding sub-portion 53 extending outward from Address 4 of Slot Number 91 of the slots 11a are TIG welded, and a winding start end portion 53a of the third winding sub-portion 53 extending outward from Address 3 of Slot Number 1 of the slots 11a and a winding finish end portion 51b of the first winding sub-portion 51 extending outward from Address 2 of Slot Number 91 of the slots 11a are TIG welded, forming a second two-turn winding.

In addition, the linking portion 41 of the conductor wire 40 of the third winding sub-portion 53 extending outward at the first end surface of the stator core 11 from Address 3 of Slot Number 61 of the slots 11a and Address 4 of Slot Number 67 of the slots 11a is cut, and the linking portion 41 of the conductor wire 40 of the fourth winding sub-portion 54 extending outward at the first end surface of the stator core 11 from Address 3 of Slot Number 67 of the slots 11a and Address 4 of Slot Number 73 of the slots 11a is cut. A first cut end 53c of the third winding sub-portion 53 and a first cut end 54c of the fourth winding sub-portion 54 are joined together to form the four-turn first winding phase portion 37 in which the first to fourth winding sub-portions 51 to 54 are connected in series.

Moreover, a second cut end 53d of the third winding sub-portion 53 and a second cut end 54d of the fourth winding sub-portion 54 become an output wire (O) and a neutral point (N), respectively.

A total of six (first to sixth) winding phase portions 37 are formed in a similar manner by offsetting the slots 11a in which the conductor wires 40 are installed by one slot each.

In addition, the first winding phase portion 37 installed in the slot group including Slot Numbers 1, 7, etc., through 91, the third winding phase portion 37 installed in the slot group including Slot Numbers 3, 9, etc., through 93, and the fifth winding phase portion 37 installed in the slot group including Slot Numbers 5, 11, etc., through 95 are formed into a Y connection by joining together the neutral points (N) thereof, and the second winding phase portion 37 installed in the slot group including Slot Numbers 2, 8, etc., through 92, the fourth winding phase portion 37 installed in the slot group including Slot Numbers 4, 10, etc., through 94, and the sixth winding phase portion 37 installed in the slot group including Slot Numbers 6, 12, etc., through 96 are formed into a Y connection by joining together the neutral points (N) thereof in a similar manner to prepare two three-phase alternating-current windings and obtain the stator 35. Moreover, the two three-phase alternating-current windings constitute the stator winding 36.

In the stator 35 constructed in this manner, the slot-housed portions 42, which have a rectangular cross section, are arranged so as to line up in single rows in a slot depth direction inside each of the slots 11a with the flat surfaces thereof brought into close contact with the side wall surfaces of each of the slots 11a by means of the insulators 13.

In pairs of slots 11a separated by six slots, at the first axial end of the stator core 11, the slot-housed portions 42 housed in Address 1 and Address 2 of the pair of slots 11a are connected in series by a linking portion 41 having a circular cross section, and the slot-housed portions 42 housed in Address 3 and Address 4 of the pair of slots 11a are connected in series by a linking portion 41 having a circular cross section. These two rows of linking portions (first coil ends) are arranged so as to be separated in a radial direction. Hence, the first coil ends are arranged neatly in rows at a pitch of one slot in a circumferential direction so as to be separated from each other in a radial direction and a circumferential direction, constituting a first coil end group 36a.

Similarly, in pairs of slots 11a separated by six slots, at the second axial end of the stator core 11, the slot-housed portions 42 housed in Address 1 and Address 2 of the pair of slots 11a are connected in series by a linking portion 41 having a circular cross section, and the slot-housed portions 42 housed in Address 3 and Address 4 of the pair of slots 11a are connected in series by a linking portion 41 having a circular cross section. These two rows of linking portions (second coil ends) are arranged so as to be separated in a radial direction. Hence, the second coil ends are arranged neatly in rows at a pitch of one slot in a circumferential direction so as to be separated from each other in a radial direction and a circumferential direction, constituting a second coil end group 36b.

Consequently, in Embodiment 7, the space factor of the conductors in the slots 11a can also be increased and alignment in rows and increased density are enabled in the first and second coil end groups 36a and 36b, providing a stator which can achieve compactness and high output.

Because the linking portions 41 constituting the first and second coil ends are formed with a circular cross section, stresses arising in the return portions 41a when the conductor wires 40 are bent to form the return portions 41a of the linking portions 41 are reduced, suppressing damage to the electrically-insulating coating covering the return portions 41a, thereby enabling electrical insulation to be improved.

Because the linking portions 41 are formed with a circular cross section, even if the linking portions 41 (the first and second coil ends) come into contact with each other during assembly of the stator winding 36 or due to vibrations generated during operation of an actual machine mounted with the stator 35, damage to the electrically-insulating coating is suppressed, enabling electrical insulation to be improved.

Because the output wires O and the neutral points N of the stator winding 36 are formed with a circular cross section, removal of the electrically-insulating coating covering the end portions of the output wires O and the neutral points N is simplified. Thus, when the stator 35 is mounted to an alternator, connection between the output wires O of the stator 35 and a rectifier can be performed simply and reliably.

Next, a method for assembling the stator 35 will be explained in detail with reference to FIGS. 16 to 21C.

First, twelve continuous conductor wires 39 are lined up at a pitch of one slot on a plane. Then, as shown in FIG. 16, the twelve conductor wires 39 are folded over together at a predetermined pitch (at the positions of the double-dotted chain lines), forming a strip-shaped winding unit 43 in which the twelve conductor wires 39 are wound into a helical shape so as to be inclined at an angle of α degrees relative to a center line L, as shown in FIG. 17. The conductor wires 39 are each composed of the copper wire material 60 having a circular cross section covered with an electrically-insulating coating.

A first pair of pin groups 44 is inserted between the conductor wires 39 from a front side of the strip-shaped winding unit 43 at positions separated by a distance D relative to a width direction of the strip-shaped winding unit 43. Similarly, a second pair of pin groups 44 is inserted between the conductor wires 39 from a rear side of the strip-shaped winding unit 43 at positions separated by a distance D in a width direction of the strip-shaped winding unit 43. In addition, position-regulating pin groups 45 are inserted between the conductor wires 39 at edge portions in a width direction of the strip-shaped winding unit 43. Hence, the first, second, and position-regulating pin groups 44 and 45 are set as shown in FIG. 17. Here, the distance D generally matches a groove length of slots 58a of a laminated core 58 described below (an axial length of the stator core 11).

Then, the pin groups 44 in the first pair of pin groups 44 inserted between the conductor wires 39 from the front side of the strip-shaped winding unit 43 are moved in mutually opposite directions in a longitudinal direction of the strip-shaped winding unit 43, as indicated by solid arrows in FIG. 17. Similarly, the pin groups 44 in the second pair of pin groups 44 inserted between the conductor wires 39 from the rear side of the strip-shaped winding unit 43 are moved in mutually opposite directions in the longitudinal direction of the strip-shaped winding unit 43, as indicated by broken arrows in FIG. 17. At this time, the conductor wires 39 are prevented from coming apart because the position-regulating pin groups 45 are inserted between the conductor wires 39.

Thus, the portions of the conductor wires 39 positioned between the pairs of pin groups 44 are deformed so as to become perpendicular to the longitudinal direction of the strip-shaped winding unit 43. Hence, straight portions 56a deformed so as to be perpendicular to the longitudinal direction of the strip-shaped winding unit 43 overlap and form pairs in a front-to-back direction of the strip-shaped winding unit 43, ninety-six pairs being arranged at a pitch of one slot in the longitudinal direction of the strip-shaped winding unit 43. The portions of the conductor wires 39 positioned outside the pairs of pin groups 44 become linking portions linking straight portions 56a six slots apart. The strip-shaped winding unit 56 prepared in this manner is constructed into a winding construction equivalent to the winding assembly 57 shown in FIG. 19 described below except for the fact that the straight portions 56a have a circular cross section. In other words, the strip-shaped winding unit 56 is constructed such that the conductor wires 39 are formed into a pattern in which the straight portions 56a are disposed at a pitch of six slots and linked by the linking portions, and adjacent pairs of the straight portions 56a are alternately offset by a width (w) of the conductor wires 39 on a first and second side in the width (thickness) direction by the linking portions, pairs of conductor wires 39 being formed by disposing two conductor wires 39 so as to be offset by a pitch of six slots from each other with straight portions 56a superposed, six pairs of conductor wires 39 being offset by a pitch of one slot from each other.

Next, the strip-shaped winding unit 56 is set in a press jig 46. As shown in FIG. 18, this press jig 46 is constituted by: a die 47 in which press grooves 48 are arranged at a pitch of one slot; and a press tool 49 on which press bars 49a are arranged at a pitch of one slot. The press grooves 48 are formed with a groove length generally matching the groove length of the slots 58a of the laminated core 58 described below (the axial length of the stator core 11), and each is constituted by: a first press groove portion 48a having a groove width equivalent to the diameter of the conductor wires 39; and a second press groove portion 48b having a groove width which is narrower than the groove width of the first press groove portion 48a, the second press groove portion 48b being formed so as to follow on from the first press groove portion 48a. The press bars 49a have a length generally matching the groove length of the press grooves 48 and a width generally matching the groove width of the second press groove portions 48b.

Then, as shown in FIG. 18A, the strip-shaped winding unit 56 is set in the die 47 such that a pair of straight portions 56a is housed inside the first press groove portion 48a of each of the press grooves 48. Thereafter, the press tool 49 is set such that a press bar 49a is positioned inside the first press groove portion 48a of each of the press grooves 48, and the press tool 49 is moved downward in FIG. 18A.

Hence, the straight portion 56a of each of the pairs are pressed, and are pushed from the first press groove portions 48a into the second press groove portions 48b while plastically deforming, eventually coming into contact with bottom portions of the second press groove portions 48b. The straight portions 56a of each of the pairs are pressed further by the press tool 49 to form slot-housed portions 42 having a rectangular cross section as shown in FIG. 18B. Thereafter, the press tool 49 is pulled out and the strip-shaped winding unit 56 is extracted from the die 47 to obtain the winding assembly 57 shown in FIG. 19.

The winding assembly 57 prepared in this manner is constructed such that ninety-six pairs of the slot-housed portions 42 which are superposed in a direction that is perpendicular to the surface of the page in FIG. 19 (corresponding to the thickness direction of the winding assembly 57) are arranged at a pitch of one slot and any given slot-housed portion 42 on a first side in the thickness direction in a first pair of the slot-housed portion 42 is linked by a linking portion 41 to a slot-housed portion 42 on a second side in the thickness direction in a second pair of the slot-housed portion 42 six slots away. In other words, as shown in FIG. 20, conductor wires 40 are formed into a pattern in which the slot-housed portions 42 are disposed at a pitch of six slots and linked by the linking portions 41, and adjacent pairs of the slot-housed portions 42 are alternately offset by a width (w) of the conductor wires 40 on a first and second side in the width (thickness) direction by the linking portions 41, pairs of conductor wires 40 being formed by disposing two conductor wires 40 so as to be offset by a pitch of six slots from each other with slot-housed portions 42 superposed. Six pairs of the conductor wires 40 constructed in this manner are arranged so as to be offset by a pitch of one slot from each other to constitute the winding assembly 57.

Next, as shown in FIG. 21A, an insulator 13 is mounted to each of the slots 58a of a laminated core 58. This laminated core 58 is formed into a rectangular parallelepiped by laminating a large number of magnetic steel plates, being formed with ninety-six slots 58a. As shown in FIG. 21B, two winding assemblies 57 are stacked and mounted to the laminated core 58 from the opening ends of the slots 58a. Hence, the winding assemblies 57 are mounted to the laminated core 58 such that four slot-housed portions 42 are housed in the slots 58a so as to line up in a single row in a slot depth direction with the longitudinal axes of the rectangular cross sections thereof aligned in the slot depth direction.

Thereafter, as shown in FIG. 21C, the laminated core 58 mounted with the two winding assemblies 57 is bent into an annular shape, first and second ends of the laminated core 58 bent into the annular shape are abutted, and the abutted portion is laser welded. The laminated core 58 integrated by welding the first and second ends thereof becomes the stator core 11.

Hence, according to Embodiment 7, because the winding assemblies 57 used are each constructed such that conductor wires 40 are formed into a pattern in which the slot-housed portions 42 are disposed at a pitch of six slots and linked by the linking portions 41, and adjacent pairs of the slot-housed portions 42 are alternately offset by a width (w) of the conductor wires 40 on a first and second side in the width direction by the linking portions 41, pairs of conductor wires 40 being formed by disposing two conductor wires 40 so as to be offset by a pitch of six slots from each other with slot-housed portions 42 superposed, and six pairs of the conductor wires 40 being arranged so as to be offset by a pitch of one slot from each other, joining operations at the second end surface of the stator core 11 are significantly reduced compared to Embodiment 1 above in which the U-shaped conductor segments 15 were used, improving assembly of the stator.

Because the winding assemblies 57 are prepared by pressing the ninety-six pairs of straight portions 56*a* in the strip-shaped winding unit 56 simultaneously using the press jig 46, all of the straight portions 56*a* are plastically deformed into a rectangular cross section at once, simplifying the process of manufacturing the winding assemblies 57, thereby enabling manufacturing time to be shortened.

Because the slot-housed portions 42 are formed with a rectangular cross section by press-forming the straight portions 56*a*, which have a circular cross section, the hardness of the slot-housed portions 42 is greater than that of the inclined portions 41*b* of the linking portions 41. Thus, the linking portions 41 functioning as first and second coil ends are easily deformed, and even if the linking portions 41 come into contact with each other, damage to the electrically-insulating coating 14 is less likely to occur, improving electrical insulation.

Because the press grooves 48 of the die 47 are constituted by the first press groove portions 48*a*, which have a broad groove width, and the second press groove portions 48*b*, which have a narrow groove width, the straight portions 56*a* of the strip-shaped winding unit 56 are easily mounted into the press grooves 48, improving the press-working operation. Because the straight portions 56*a* are pressed by the press bars 49*a* and pushed from the first press groove portions 48*a* into the second press groove portions 48*b* while plastically deforming, the straight portions 56*a*, which have a circular cross section, can be easily deformed into a rectangular cross section. Here, because the straight portions 56*a* are stretched in the press groove direction, the electrically-insulating coating on the long sides of the slot-housed portions 42 is also stretched, becoming thin. Because the long sides of the slot-housed portions 42 (flat portions) are placed in close contact with side wall surfaces of the slots 11*a* by means of the insulators 13, heat generated in the slot-housed portions 42 is transferred to the stator core 11 efficiently. As a result, heat generated in the slot-housed portions 42 of the stator winding 36 is dissipated by the stator core 11, which has a large heat-dissipating surface area, suppressing temperature increases in the stator 35.

Moreover, in Embodiment 7, the first and second coil ends are arranged so as to be separated in a circumferential direction, but the first and second inclined portions of the first and second coil ends may also be arranged so as to be in close contact in a circumferential direction. In that case, ventilation resistance in the first and second coil end groups is reduced, achieving effects similar to Embodiment 6 above.

Embodiment 8

Figure 22A:
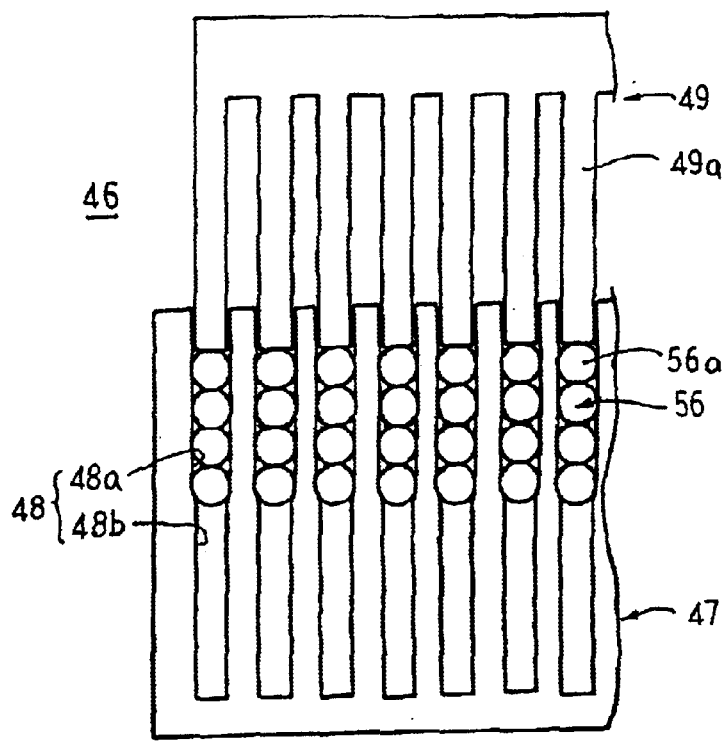
FIG. 22A is a diagram explaining a pressing process for a winding assembly used in a stator winding of a stator for an automotive alternator according to Embodiment 8 of the present invention.
Figure 22B:
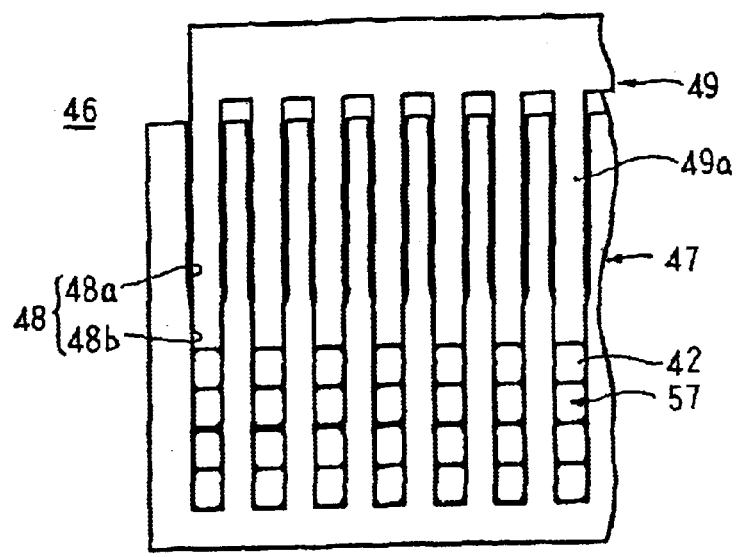
FIG. 22B is another diagram explaining the pressing process for the winding assembly used in the stator winding of the stator for an automotive alternator according to Embodiment 8 of the present invention.

In Embodiment 7 above, one strip-shaped winding unit 56 is pressed by the press jig 46, but in Embodiment 8, as shown in FIGS. 22A and 22B, two strip-shaped winding units 56 are pressed simultaneously by the press jig 46.

Consequently, according to Embodiment 8, the number of pressing operations for the strip-shaped winding units 56 is reduced to one, enabling reductions in manufacturing man-hours.

Moreover, in Embodiment 8 above, explanation is made for cases in which two strip-shaped winding units 56 are pressed simultaneously by the press jig 46, but the number of strip-shaped winding units 56 simultaneously pressed by the press jig 46 is not limited to two. For example, when there are three winding assemblies 57 to be installed in the stator core 11, three strip-shaped winding units 56 may be pressed simultaneously by the press jig 46.

Embodiment 9

In Embodiment 7 above, the winding assemblies 57 are prepared by pressing the strip-shaped winding units 56 in the press jig 46, but in Embodiment 9, the winding assemblies 57 are prepared by press forming, then in addition, a second electrically-insulating coating 14*a* is coated onto the slot-housed portions 42 of the winding assemblies 57, which have been deformed into a rectangular cross section.

Figure 23A:
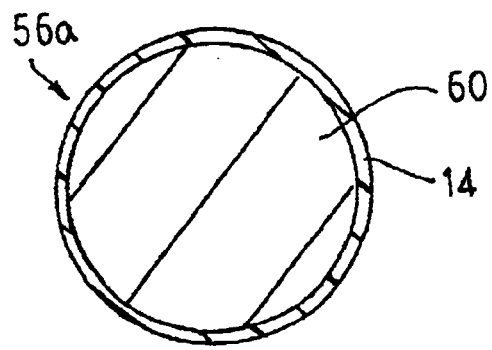
FIG. 23A is a process cross section explaining a method for manufacturing a winding assembly used in the stator winding of the stator for an automotive alternator according to Embodiment 9 of the present invention.
Figure 23B:
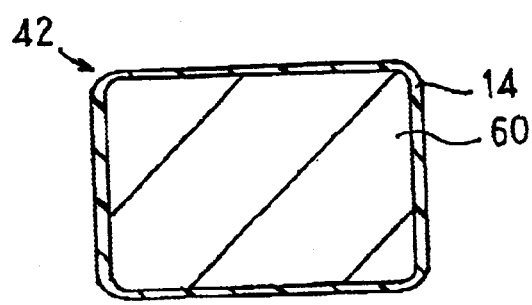
FIG. 23B is another process cross section explaining the method for manufacturing the winding assembly used in the stator winding of the stator for an automotive alternator according to Embodiment 9 of the present invention.
Figure 23C:
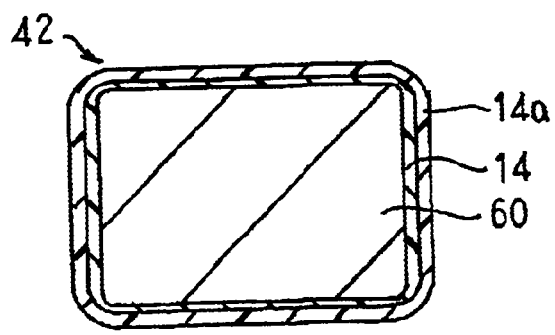
FIG. 23C is still another process cross section explaining the method for manufacturing the winding assembly used in the stator winding of the stator for an automotive alternator according to Embodiment 9 of the present invention.

In other words, the straight portions 56*a* of the strip-shaped winding unit 56 prepared using the conductor wires 39 having a circular cross section, have a circular cross section to begin with, as shown in FIG. 23A. When this strip-shaped winding unit 56 is pressed by the press jig 46, the straight portions 56*a* are deformed into a rectangular cross section, as shown in FIG. 23B, becoming the slot-housed portions 42. Then, the second electrically-insulating coating 14*a* is coated onto the slot-housed portions 42. Hence, the slot-housed portions 42 have a two-layer construction including the first electrically-insulating coating 14 and the second electrically-insulating coating 14*a*, as shown in FIG. 23C.

In Embodiment 7 above, when the winding assembly 57 is prepared by the press jig 46, the copper wire material 60 of the straight portions 56*a* plastically deforms and the first electrically-insulating coating 14 covering the long sides of the rectangular cross section is also stretched, becoming thin. Hence, cracks may arise in the first electrically-insulating coating 14 on the long sides and at the corner portions of the rectangular cross sections of slot-housed portions 42, causing insulation failure.

However, according to Embodiment 9, because the winding assemblies 57 are prepared by press forming, then in addition, a second electrically-insulating coating 14*a* is coated onto the slot-housed portions 42 of the winding assemblies 57, which have been deformed into a rectangular cross section, the electrically-insulating coating covering the slot-housed portions 42 has a two-layer construction including the first electrically-insulating coating 14 and the second electrically-insulating coating 14*a*, whereby cracks arising in the first electrically-insulating coating 14 are filled by the second electrically-insulating coating 14*a*, improving electrical insulation.

The material in the electrically-insulating coating will now be explained.

Superior adhesion is required in the first electrically-insulating resin 14 covering the copper wire material 60, because press forming is applied. Thus, it is desirable to use an adhesion-enhanced resin such as a polyesterimide resin, for example, in the first electrically-insulating coating 14.

Because press forming is not applied to the second electrically-insulating coating 14*a*, it is desirable to use a heat-tolerant resin such as polyamide-imide resin, for example, therein.

Moreover, by adopting a two-layer construction for the electrically-insulating coating, even if the same resin is used for the first electrically-insulating coating 14 and the second electrically-insulating coating 14*a*, because cracks generated in the first electrically-insulating coating 14 by press forming are filled by the second electrically-insulating coating 14*a*, effects enabling improved electrical insulation are achieved. If an adhesion-enhanced resin is used for the first electrically-insulating coating 14 and a heat-tolerant resin is used for the second electrically-insulating coating 14*a*, cracks are less likely to be generated during press forming and softening of the electrically-insulating coating due to the generation of heat by the stator winding is suppressed, further improving electrical insulation.

Embodiment 10

Figure 24:
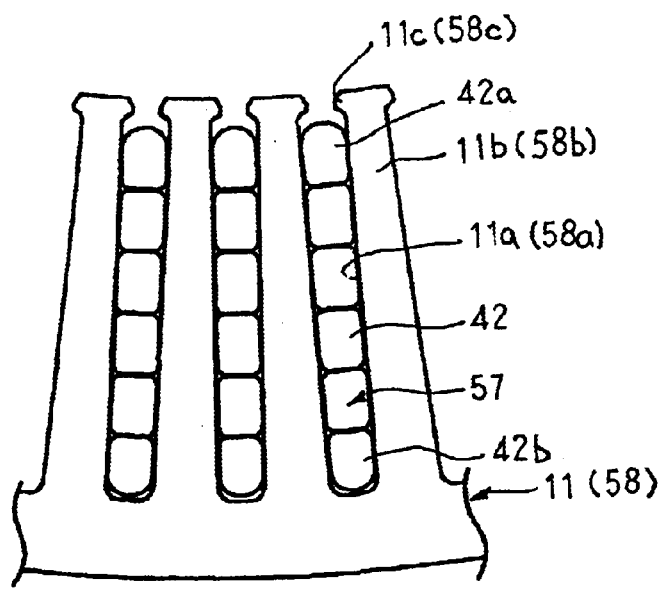
FIG. 24 is a cross section explaining arrangement of conductor wires in slots in a stator for an automotive alternator according to Embodiment 10 of the present invention.

In Embodiment 10, as shown in FIG. 24, winding assemblies 57 are stacked in three layers and installed in the stator core 11. In other words, each of the winding phase portions of the stator winding is formed into a six-turn wave winding. In each of the slots 11a, six slot-housed portions 42 are arranged in a single row with the longitudinal axes of the rectangular cross sections thereof aligned radially.

Here, the inner-circumferential end surface of the slot-housed portions 42a positioned in the innermost circumferential layer is formed into an arc shape, and the outer-circumferential end surface of the slot-housed portions 42b positioned in the outermost circumferential layer is also formed into an arc shape. In other words, the slot-housed portions 42a and 42b positioned in the innermost circumferential layer and the outermost circumferential layer are formed with a bullet-shaped cross section.

Moreover, the rest of this embodiment is constructed in a similar manner to Embodiment 7 above.

According to Embodiment 10, because the slot-housed portions 42b positioned in the outermost circumferential layer are formed with a bullet-shaped cross section, the winding assemblies 57 can be inserted smoothly when being mounted into the slots 58a (11a) of the laminated core 58 from a radially-inner side. Damage to the electrically-insulating coating 14 resulting from rubbing between tip portions of the slot-housed portions 42b and side wall surfaces of the slots 58a is suppressed, improving electrical insulation.

Because the slot-housed portions 42a positioned in the innermost circumferential layer are formed with a bullet-shaped cross section, contact between the slot-housed portions 42a and flange portions 58c of tooth portions 58b (11b) of the laminated core 58 (11c) is suppressed when the laminated core 58 is bent into an annular shape. Hence, damage to the electrically-insulating coating 14 resulting from contact between tip portions of the slot-housed portions 42a and the flange portions 58c of the tooth portions 58b is suppressed, improving electrical insulation.

Figure 25:
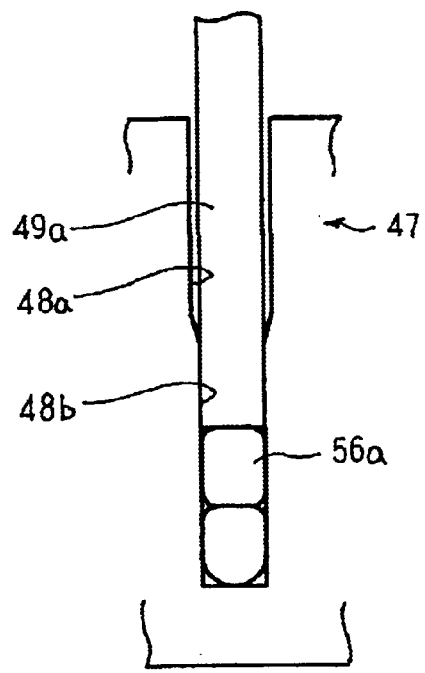
FIG. 25 is a diagram explaining a pressing process for a winding assembly used in a stator winding of the stator for an automotive alternator according to Embodiment 10 of the present invention.
Figure 26:
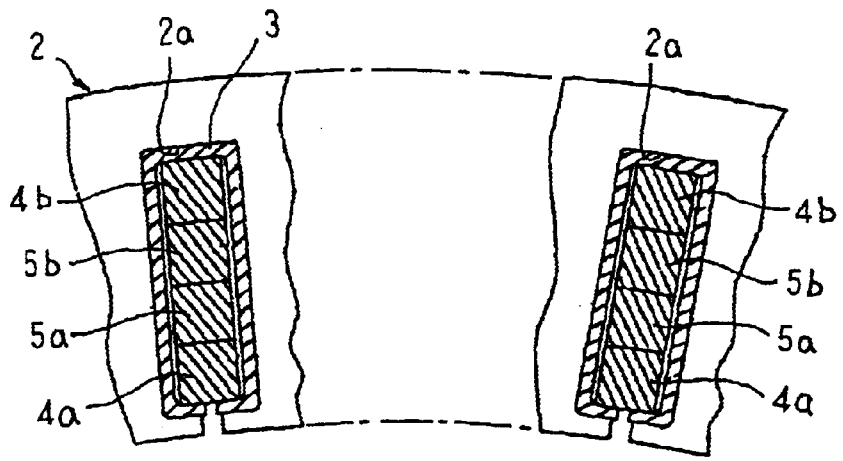
FIG. 26 is a cross section showing part of a conventional stator for an automotive alternator.
Figure 27:
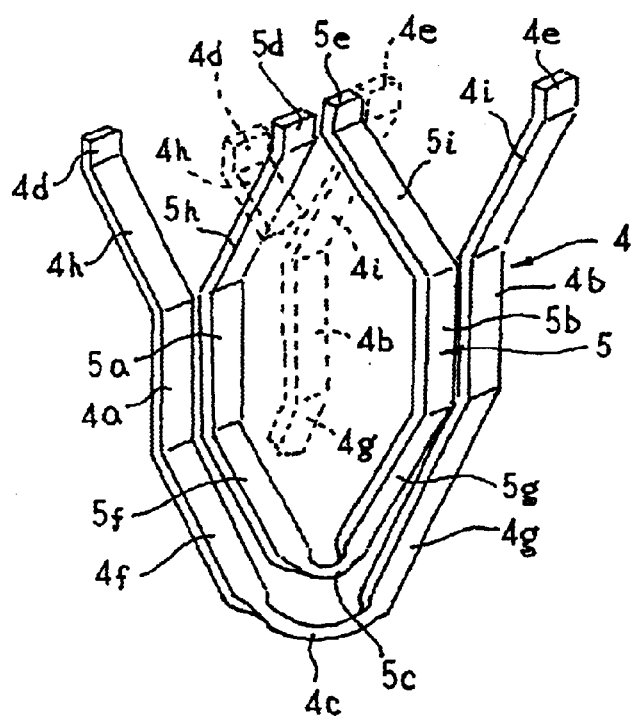
FIG. 27 is a perspective showing conductor segments constituting a stator winding of the stator conventional stator for an automotive alternator.

Here, as shown in FIG. 25, the innermost and outermost slot-housed portions 42a and 42b can be formed after a pair of the straight portions 56a has come into contact with a bottom portion of the second press groove portion 48b by stopping pressure generated by the press bars 49a before the surface of the straight portion 56a which is in contact with the bottom portion of the second press groove portion 48b becomes flat.

The innermost slot-housed portions 42a do not have to be formed into an arc shape around the entire inner-circumferential end surface thereof, it is sufficient that the radius of curvature of the corner portions on an inner circumferential side of the innermost slot-housed portions 42a is formed greater than the radius of curvature of the corner portions on the outer circumferential side. Similarly, the outermost slot-housed portions 42b do not have to be formed into an arc shape around the entire outer-circumferential end surface thereof, it is sufficient that the radius of curvature of the corner portions on an outer circumferential side of the outermost slot-housed portions 42b is formed greater than the radius of curvature of the corner portions on the inner circumferential side.

Moreover, in each of the above embodiments, the slot-housed portions are connected by linking portions having a circular cross section, but the cross-sectional shape of the linking portions is not limited to a circular cross section; the linking portions may have any non-flat cross-sectional shape. Here, a non-flat cross-sectional shape is a cross section having a substantially even diameter in all directions and includes cross-sectional shapes such as circles, squares, and regular polygons. The slot-housed portions may have a flat cross-sectional shape, and cross-sectional shapes such as rectangles, ovals, and bullet shapes may be used.

The present invention is constructed in the above manner and exhibits the effects described below.

According to one aspect of the present invention, there is provided a stator for an automotive alternator including:

a stator core in which a plurality of slots are formed; and a stator winding formed by installing conductor wires in the slots, the conductor wires being covered with an electrically-insulating coating, the stator winding being provided with:

slot-housed portions each formed with a flat cross-sectional shape, $2n$ of the slot-housed portions being housed in each of the slots, where n is an integer, and the slot-housed portions being arranged so as to line up in a single row in a slot depth direction inside each of the slots such that flat surfaces of the slot-housed portions are in close contact with side wall surfaces of the slots;

n first coil ends each connecting in series a pair of slot-housed portions housed in different addresses relative to the slot depth direction in each pair of first and second slots separated by a predetermined number of slots by means of a continuous conductor wire having a non-flat cross section at a first axial end of the stator core; and n second coil ends each connecting in series a pair of slot-housed portions housed in different addresses relative to the slot depth direction in the each pair of first and second slots separated by the predetermined number of slots at a second axial end of the stator core, wherein the n first coil ends are arranged at a pitch of one slot in a circumferential direction to constitute a first coil end group, and the n second coil ends are arranged at a pitch of one slot in the circumferential direction to constitute a second coil end group, thereby providing a stator for an automotive alternator enabling compactness and high output to be achieved in an automotive alternator, and also enabling electrical insulation to be improved.

Each of the second coil ends may be formed by a continuous conductor wire having a non-flat cross section, suppressing damage to the electrically-insulating coating due to contact among the second coil ends, thereby further improving electrical insulation.

A cross-sectional area of the coil ends having the non-flat cross section may be larger than a cross-sectional area of the slot-housed portions, suppressing the amount of heat generated in the coil ends when mounted to an automotive alternator, thereby enabling reductions in the size of a cooling fan.

The slot-housed portions housed in an outermost address in the slots may be formed with a cross-sectional shape in which a radius of curvature of radially-outer corner portions is greater than a radius of curvature of radially-inner corner portions, suppressing contact between the conductor wires and the slots when the conductor wires are being installed in the slots, thereby suppressing damage to the electrically-insulating coating and improving electrical insulation.

The slot-housed portions housed in an innermost address in the slots may be formed with a cross-sectional shape in which a radius of curvature of radially-inner corner portions is greater than a radius of curvature of radially-outer corner portions, suppressing damage to the electrically-insulating coating resulting from contact between flange portions on tooth tips and the slot-housed portions, thereby improving electrical insulation.

The electrically-insulating coating on the flat surfaces of the slot-housed portions in close contact with the side wall surfaces of the slots may be formed so as to be thinner than the electrically-insulating coating on radially-outer and inner portions of the slot-housed portions, whereby heat generated in the slot-housed portions is transferred swiftly to the stator core, which has a large heat-dissipating surface area, and is dissipated from the surface of the stator core, suppressing temperature increases in the stator winding.

The electrically-insulating coating of the slot-housed portions may be applied in two layers, suppressing damage to the electrically-insulating coating of the slot-housed portions, thereby improving electrical insulation.

The electrically-insulating coating may be constituted by:
  a lower electrically-insulating coating composed of an adhesion-enhanced resin; and
  an upper electrically-insulating coating composed of a heat-tolerant resin,
  suppressing damage to the electrically-insulating coating resulting from bending, and also suppressing softening of the electrically-insulating coating resulting from the generation of heat in the stator winding, thereby achieving superior electrical insulation.

The first and second coil end groups may be constructed such that inclined portions of the first and second coil ends inclined relative to an axial direction of the stator core are arranged so as to be placed in contact in the circumferential direction, the inclined portions being positioned between portions rising from the slot-housed portions and apex portions, reducing the amount of the first and second coil end groups extending outward from the end surfaces of the stator core, thereby enabling reductions in ventilation resistance in the first and second coil end groups when mounted to an automotive alternator.

The slot-housed portions may be formed so as to have a hardness which is greater than that of inclined portions inclined relative to an axial direction of the stator core in the coil ends having the non-flat cross section, the inclined portions being positioned between portions rising from the slot-housed portions and apex portions, whereby the inclined portions of the coil ends are easily deformed, making damage to the electrically-insulating coating less likely to arise even if the coil ends contact each other, thereby improving electrical insulation.

An output wire of the stator winding extending outward from either of the first and second coil end groups may be formed so as to have a circular cross section, facilitating connection operations between the output wire and a rectifier.

According to another aspect of the present invention, there is provided a method for manufacturing a stator for an automotive alternator including the steps of:
  preparing a strip-shaped winding unit constructed by arranging conductor wire pairs equal in number to a predetermined slot pitch so as to be offset by a pitch of one slot from each other, conductor wires in the conductor wire pairs having a non-flat cross-sectional shape covered with a first electrically-insulating coating, each of the conductor wires being formed into a pattern in which straight portions are linked by linking portions and arranged at the predetermined slot pitch and adjacent pairs of the straight portions are offset so as to alternately occupy an inner layer and an outer layer in a slot depth direction by the linking portions, and each of the conductor wire pairs being formed by arranging two of the conductor wires so as to be offset by the predetermined slot pitch from each other with the straight portions superposed;
  preparing a winding assembly by press forming the straight portions of the winding unit into a flat cross-sectional shape;
  mounting the winding assembly into a rectangular parallelepiped laminated core by inserting the straight portions of the winding assembly into slots of the laminated core from a slot opening side; and
  forming a stator core by bending the laminated core mounted with the winding assembly into an annular shape, abutting end surfaces of the laminated core, and integrating the end surfaces of the laminated core by welding,
  significantly reducing the number of joints at the end surfaces of the stator core, thereby providing a method for manufacturing a stator for an automotive alternator having a superior rate of production.

The step of preparing the winding assembly may use a die being provided with:
  first press groove portions having a groove width equal to or greater than a width of the straight portions; and
  second press groove portions having a groove width narrower than the width of the straight portions, each of the second press groove portions being disposed so as to extend continuously from one of the first press groove portions in a groove depth direction,
  wherein the straight portions are deformed into the flat cross-sectional shape by housing the straight portions of the winding unit inside the first press groove portions, and then pressing the straight portions from the first press groove portions into the second press groove portions, simplifying the setting of the winding unit into the die, thereby improving press-working and enabling the straight portions to be easily deformed into a flat cross-sectional shape.

The straight portions of the winding assembly mounted to the laminated core housed in a deepest position in a slot depth direction in the slots may be formed with a cross-sectional shape in which a radius of curvature of corner portions on a slot bottom side is greater than a radius of curvature of corner portions on a slot opening side, enabling the winding assembly to be mounted into the laminated core smoothly and also suppressing damage to the electrically-insulating coating resulting from contact between the straight portions and the slots, thereby improving electrical insulation.

The straight portions of the winding assembly mounted to the laminated core housed in a shallowest position in a slot depth direction in the slots may be formed with a cross-sectional shape in which a radius of curvature of corner portions on a slot opening side is greater than a radius of curvature of corner portions on a slot bottom side, suppressing contact between the flange portions of tooth portion tips on the laminated core and the straight portions when the laminated core is bent into an annular shape, suppressing damage to the electrically-insulating coating resulting from contact between the flange portions and the straight portions, thereby improving electrical insulation.

The step of preparing the winding assembly may include press forming all of the straight portions of the winding unit simultaneously, simplifying the manufacturing process, thereby enabling manufacturing time to be shortened.

The step of preparing the winding assembly may include press forming all of the straight portions of a plurality of the winding units simultaneously, further simplifying the manufacturing process, thereby enabling manufacturing time to be shortened.

The method for manufacturing a stator for an automotive alternator may further include the step of applying a second electrically-insulating coating on the straight portions of the winding assembly, whereby even if cracks are generated in the electrically-insulating resin during press forming of the straight portions, the cracks are filled by the second electrically-insulating coating, thereby improving electrical insulation.

The first electrically-insulating coating may be an adhesion-enhanced resin, and the second electrically-insulating coating may be a heat-tolerant resin, suppressing crack generation in the electrically-insulating coating during press forming of the straight portions, and suppressing softening of the second electrically-insulating coating resulting from the generation of heat in the stator winding, thereby improving electrical insulation.

What is claimed is:

1. A stator for an automotive alternator comprising:

a stator core in which a plurality of slots are formed; and a stator winding formed by installing conductor wires in said slots, said conductor wires being covered with an electrically-insulating coating, said stator winding being provided with:

slot-housed portions each formed with a flat cross-sectional shape, $2n$ of said slot-housed portions being housed in each of said slots, where n is an integer, and said slot-housed portions being arranged so as to line up in a single row in a slot depth direction inside each of said slots such that flat surfaces of said slot-housed portions are in close contact with side wall surfaces of said slots;

n first coil ends each connecting in series a pair of slot-housed portions housed in different addresses relative to the slot depth direction in each pair of first and second slots separated by a predetermined number of slots by means of a continuous conductor wire having a non-flat cross section at a first axial end of said stator core; and n second coil ends each connecting in series a pair of slot-housed portions housed in different addresses relative to the slot depth direction in said each pair of first and second slots separated by said predetermined number of slots at a second axial end of said stator core, wherein said n first coil ends are arranged at a pitch of one slot in a circumferential direction to constitute a first coil end group, and said n second coil ends are arranged at a pitch of one slot in the circumferential direction to constitute a second coil end group.

2. The stator for an automotive alternator according to claim 1 wherein each of said second coil ends are formed by a continuous conductor wire having a non-flat cross section.

3. The stator for an automotive alternator according to claim 2 wherein said slot-housed portions housed in an outermost address in said slots are formed with a cross-sectional shape in which a radius of curvature of radially-outer corner portions is greater than a radius of curvature of radially-inner corner portions.

4. The stator for an automotive alternator according to claim 2 wherein said slot-housed portions housed in an innermost address in said slots are formed with a cross-sectional shape in which a radius of curvature of radially-inner corner portions is greater than a radius of curvature of radially-outer corner portions.

5. The stator for an automotive alternator according to claim 1 wherein a cross-sectional area of said coil ends having said non-flat cross section is larger than a cross-sectional area of said slot-housed portions.

6. The stator for an automotive alternator according to claim 1 wherein said electrically-insulating coating on said flat surfaces of said slot-housed portions in close contact with said side wall surfaces of said slots is formed so as to be thinner than said electrically-insulating coating on radially-outer and inner portions of said slot-housed portions.

7. The stator for an automotive alternator according to claim 1 wherein said electrically-insulating coating of said slot-housed portions is applied in two layers.

8. The stator for an automotive alternator according to claim 7 wherein said electrically-insulating coating is constituted by:

a lower electrically-insulating coating composed of an adhesion-enhanced resin; and an upper electrically-insulating coating composed of a heat-tolerant resin.

9. The stator for an automotive alternator according to claim 1 wherein said first and second coil end groups are constructed such that inclined portions of said first and second coil ends inclined relative to an axial direction of said stator core are arranged so as to be placed in contact in the circumferential direction, said inclined portions being positioned between portions rising from said slot-housed portions and apex portions.

10. The stator for an automotive alternator according to claim 1 wherein said slot-housed portions are formed so as to have a hardness which is greater than that of inclined portions inclined relative to an axial direction of said stator core in said coil ends having the non-flat cross section, said inclined portions being positioned between portions rising from said slot-housed portions and apex portions.

11. The stator for an automotive alternator according to claim 1 wherein an output wire of said stator winding extending outward from either of said first and second coil end groups is formed so as to have a circular cross section.

* * * * *